US012674720B2

(12) United States Patent
Watanabe et al.

(10) Patent No.: US 12,674,720 B2
(45) Date of Patent: Jul. 7, 2026

(54) DISPERSION MEASURING DEVICE, AND DISPERSION MEASURING METHOD

(71) Applicant: HAMAMATSU PHOTONICS K.K., Hamamatsu (JP)

(72) Inventors: Koyo Watanabe, Hamamatsu (JP); Hisanari Takahashi, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 92 days.

(21) Appl. No.: 18/286,272

(22) PCT Filed: Mar. 14, 2022

(86) PCT No.: PCT/JP2022/011385
§ 371 (c)(1),
(2) Date: Oct. 10, 2023

(87) PCT Pub. No.: WO2022/249659
PCT Pub. Date: Dec. 1, 2022

(65) Prior Publication Data
US 2024/0201046 A1 Jun. 20, 2024

(30) Foreign Application Priority Data

May 24, 2021 (JP) ................................. 2021-087088

(51) Int. Cl.
*G01M 11/00* (2006.01)
(52) U.S. Cl.
CPC ................................. *G01M 11/338* (2013.01)
(58) Field of Classification Search
None
See application file for complete search history.

(56) References Cited

U.S. PATENT DOCUMENTS

2014/0264400 A1* 9/2014 Lipson ............... G02B 6/12007
257/432
2014/0368809 A1 12/2014 Chen et al.
(Continued)

FOREIGN PATENT DOCUMENTS

JP 2000-193558 A 7/2000
JP 2000-321171 A 11/2000
(Continued)

OTHER PUBLICATIONS

Kashyap ("Fiber Bragg Gratings," Kashyap et al., 2nd Ed., 2010, https://www.sciencedirect.com/book/9780123725790/fiber-bragg-gratings) (Year: 2010).*

(Continued)

*Primary Examiner* — Kara E. Geisel
*Assistant Examiner* — Chad Andrew Reverman
(74) *Attorney, Agent, or Firm* — Faegre Drinker Biddle & Reath LLP

(57) ABSTRACT

A dispersion measuring device includes a pulsed laser light source, a pulse forming unit, a correlator, and an arithmetic operation unit. The pulse forming unit forms an optical pulse train from an optical pulse output from the pulsed laser light source. The correlator detects a temporal waveform of correlated light formed from the optical pulse train. The arithmetic operation unit estimates a wavelength dispersion amount of an optical component disposed between the pulsed laser light source and the correlator, based on the temporal waveform of the correlated light. A dispersion medium gives a group delay dispersion to the optical pulse train to increase the peak intensity of the correlated light to be equal to or greater than a threshold value of the correlator. The pulse forming unit gives a group delay dispersion having a sign opposite to the group delay dispersion given to the optical pulse train to the optical pulse.

18 Claims, 29 Drawing Sheets

(56) References Cited

U.S. PATENT DOCUMENTS

2018/0294946 A1* 10/2018 Sinclair ................. H04B 10/61
2022/0178752 A1*  6/2022 Watanabe ............. H01S 3/0057

FOREIGN PATENT DOCUMENTS

| | | |
|---|---|---|
| JP | 2012-127898 A | 7/2012 |
| JP | 2013-096765 A | 5/2013 |
| JP | 2020-169946 A | 10/2020 |
| JP | 2022-180146 A | 12/2022 |
| WO | WO-03/042652 A1 | 5/2003 |

OTHER PUBLICATIONS

English-language translation of International Preliminary Report on Patentability (IPRP) dated Dec. 7, 2023 that issued in WO Patent Application No. PCT/JP2022/011385.

\* cited by examiner

_Fig.6_
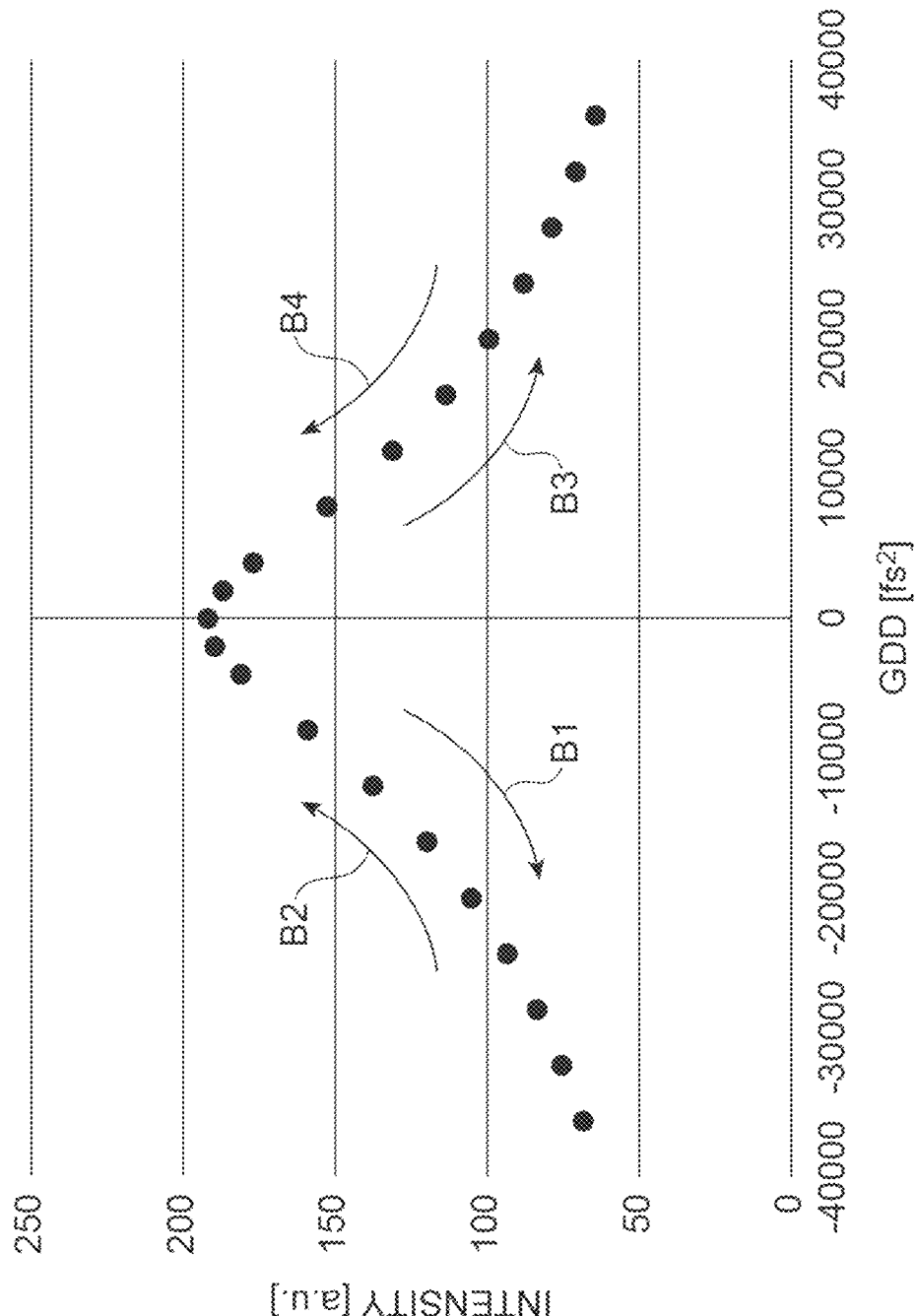

Fig.13
(a)
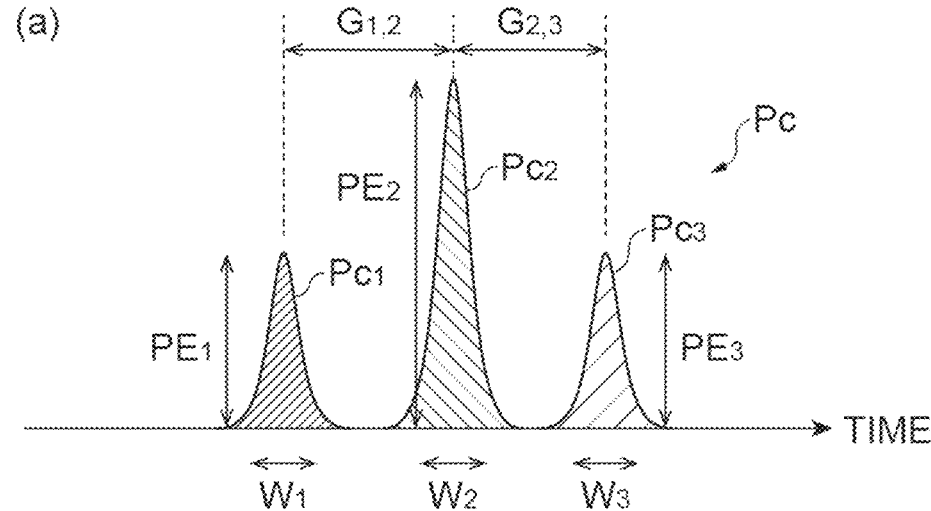
(b)
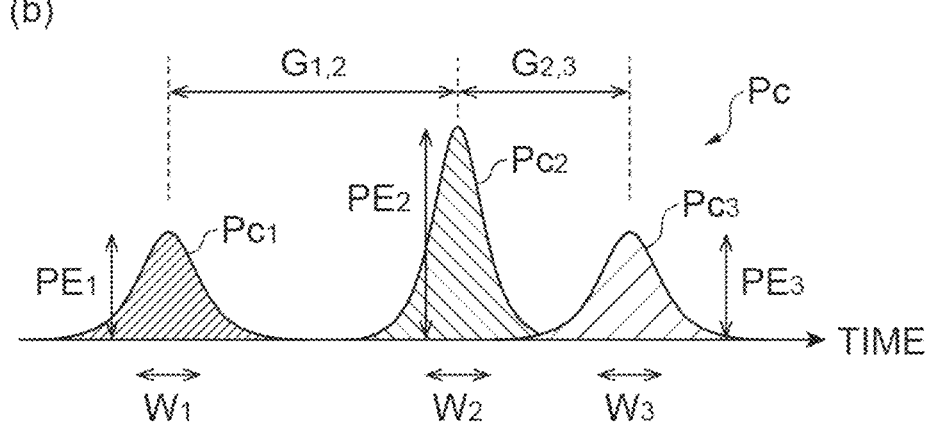

Fig.16
(a)
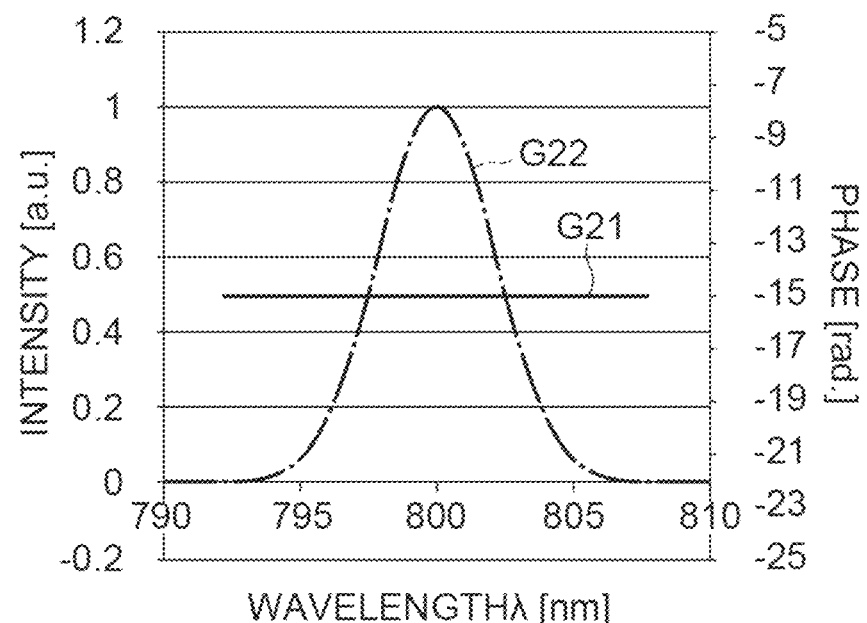
(b)
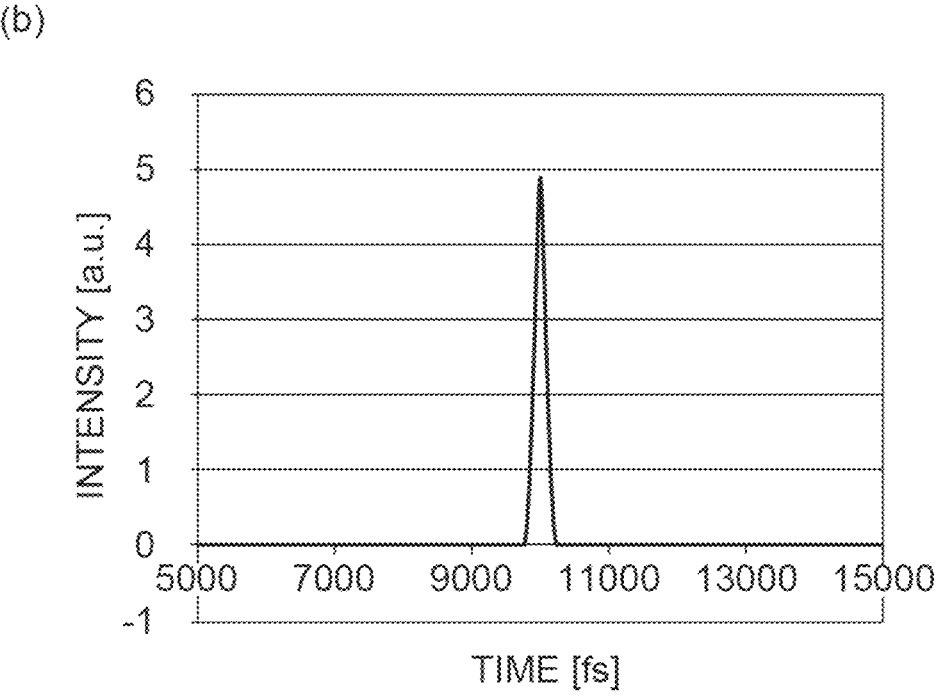

Fig.17
(a)
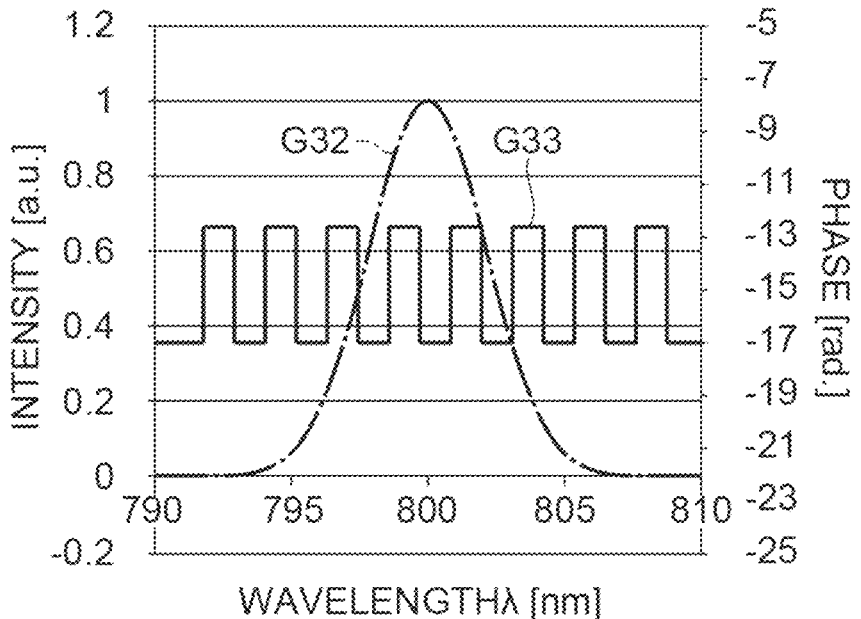
(b)
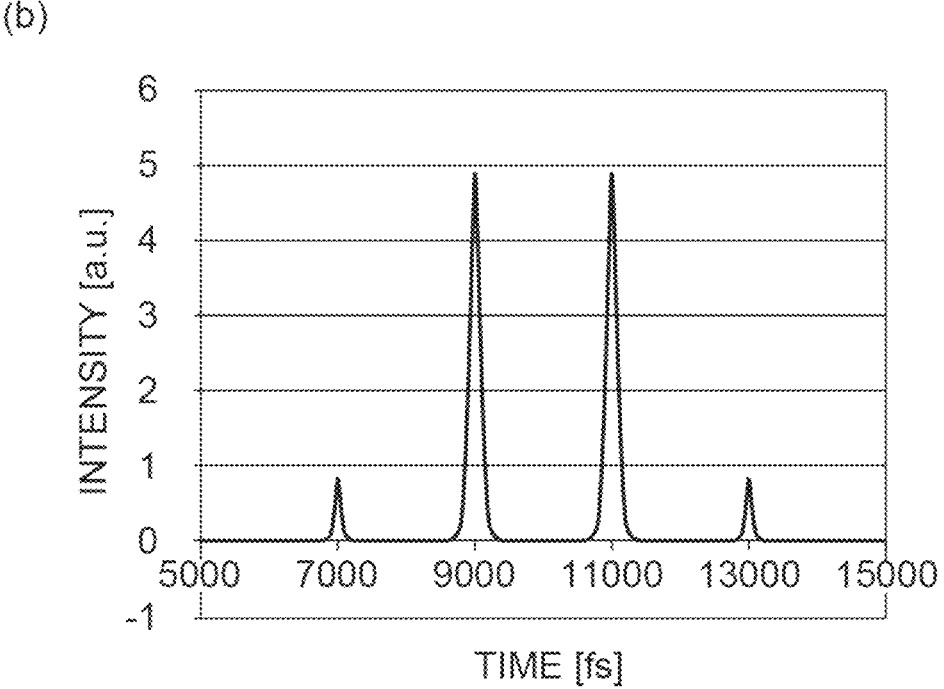

*Fig.22*

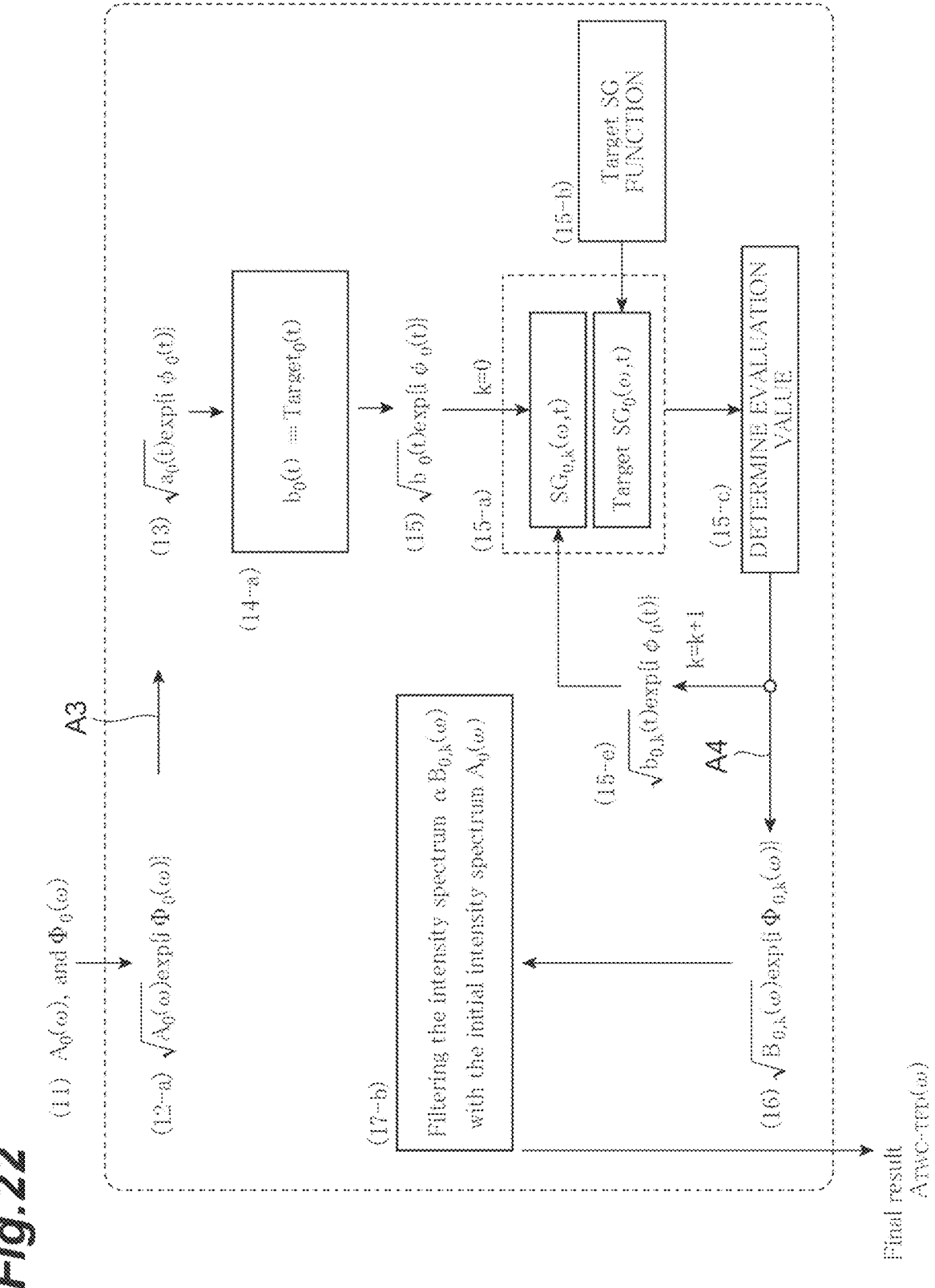

(11) $A_0(\omega)$, and $\Phi_0(\omega)$ (12-a) $\sqrt{A_0(\omega)}exp\{i\,\Phi_0(\omega)\}$

A3

(13) $\sqrt{a_0(t)}exp\{i\,\phi_0(t)\}$ (14-a) $b_0(t) = Target_0(t)$

(15) $\sqrt{b_0(t)}exp\{i\,\phi_0(t)\}$ k=0

(15-a) $SG_{0,k}(\omega,t)$

Target $SG_0(\omega,t)$ (15-b) Target SG FUNCTION (15-c) DETERMINE EVALUATION VALUE (15-e) $\sqrt{b_{0,k}(t)}exp\{i\,\phi_0(t)\}$ k=k+1

A4

(16) $\sqrt{B_{0,k}(\omega)}exp\{i\,\Phi_{0,k}(\omega)\}$ (17-b) Filtering the intensity spectrum $\alpha\,B_{0,k}(\omega)$ with the initial intensity spectrum $A_3(\omega)$ Final result $A^{TWC-TRP}(\omega)$

*Fig.25*
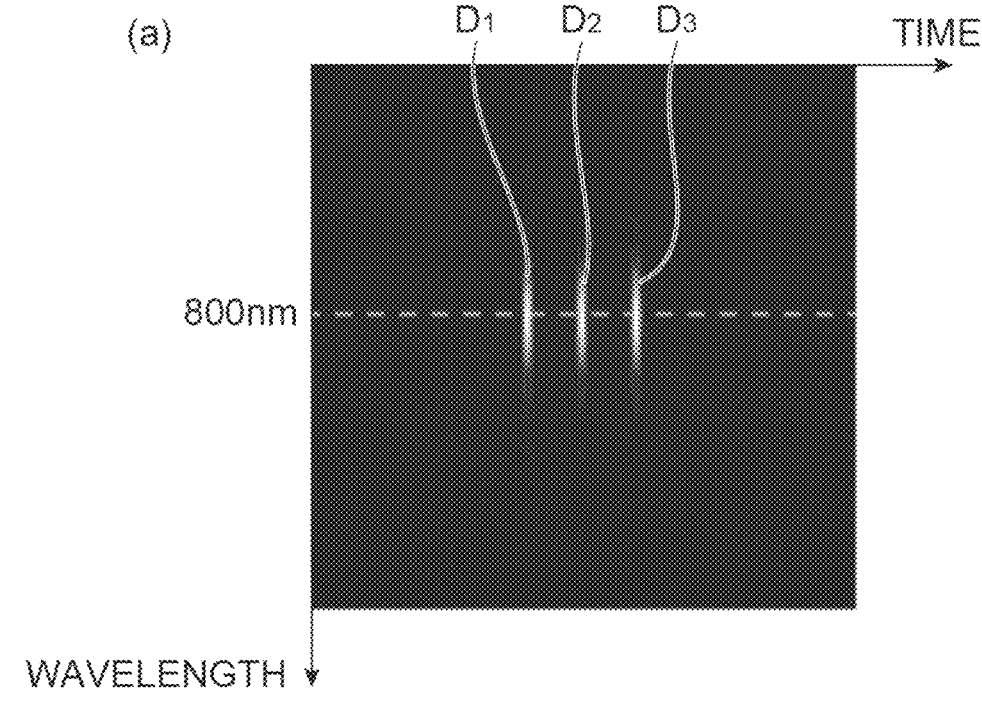
(a)
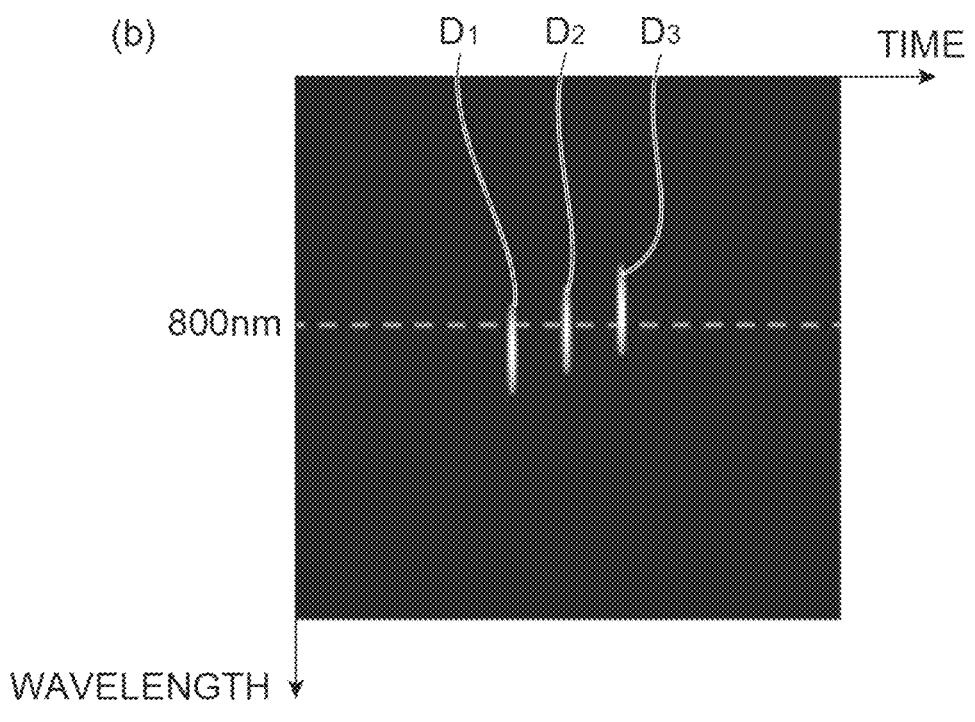
(b)

DISPERSION MEASURING DEVICE, AND DISPERSION MEASURING METHOD

TECHNICAL FIELD

The present disclosure relates to a dispersion measuring device and a dispersion measuring method.

BACKGROUND ART

Patent Literature 1 discloses a dispersion measuring device and a dispersion measuring method capable of measuring a wavelength dispersion amount of a pulsed laser light source. In such device and method, first, an optical pulse train including a plurality of optical pulses having a time difference and having center wavelengths different from each other is formed from an optical pulse to be measured output from the pulsed laser light source. Then, the optical pulse train enters into a correlation optical system. Then, correlated light including cross-correlation or autocorrelation of the optical pulse train is output from the correlation optical system. Finally, the temporal waveform of the correlated light is detected, and the wavelength dispersion amount of the pulsed laser light source is estimated from the feature amount of the temporal waveform of the detected correlated light. By inserting a measurement object such as an optical component into the optical system, it is also possible to measure the wavelength dispersion amount of the measurement object from the temporal waveform of the correlated light.

CITATION LIST

Patent Literature

Patent Literature 1: Japanese Unexamined Patent Publication No. 2020-169946

SUMMARY OF INVENTION

Technical Problem

When the wavelength dispersion amount of a measurement object is measured, a plurality of optical pulses having a time difference and having center wavelengths different from each other are transmitted through the measurement object. Thus, it is possible to estimate the wavelength dispersion amount of the measurement object based on the temporal waveforms of the plurality of optical pulses after being transmitted through the measurement object. Here, when the peak intensity of the optical pulse entering into the measurement object is large, the measurement accuracy of the wavelength dispersion amount may be lowered. For example, in a case where the measurement object is a non-linear medium such as an optical fiber or an optical waveguide, a non-linear optical phenomenon occurs when the peak intensity of the optical pulse exceeds a certain threshold value in the measurement object. This phenomenon distorts the temporal waveform of the optical pulse. In addition, for example, when the peak intensity of the optical pulse is excessively large, the measurement object may be damaged. In view of the above, when the peak intensity of the optical pulse entering into the measurement object is large, it may not possible to accurately measure the wavelength dispersion amount of the measurement object based on the temporal waveform of the optical pulse transmitted through the measurement object.

On the other hand, when the peak intensity of the optical pulse entering into the measurement object is small, the peak intensity of the optical pulse may be less than a detection threshold value in a detector that detects the temporal waveform of the optical pulse transmitted through the measurement object. In this case, since the detection accuracy of the temporal waveform of the optical pulse is lowered, it is not possible to accurately measure the wavelength dispersion amount of the measurement object based on the temporal waveform of the optical pulse.

An object of one aspect of the present disclosure is to provide a dispersion measuring device and a dispersion measuring method capable of more accurately measuring a wavelength dispersion amount of a measurement object.

Solution to Problem

According to an aspect of the present disclosure, a dispersion measuring device includes a light source, a pulse forming unit, a dispersion medium, a correlator, and an arithmetic operation unit. The light source outputs a first optical pulse. The pulse forming unit includes a spatial light modulator that presents a phase pattern for generating modulated light by applying a predetermined phase shift for each wavelength to the first optical pulse. The pulse forming unit forms, from the first optical pulse, an optical pulse train that is modulated light including a plurality of second optical pulses having a time difference from each other and having center wavelengths different from each other. The dispersion medium has a positive or negative group delay dispersion and receives an optical pulse train. The correlator includes a correlation optical system and a detector. The correlation optical system receives an optical pulse train transmitted through the dispersion medium and outputs correlated light including a plurality of third optical pulses that are cross-correlation or autocorrelation of the optical pulse train. The detector detects a temporal waveform of the correlated light. The correlator detects the temporal waveform of the correlated light formed from the optical pulse train having a peak intensity equal to or greater than a detection threshold value. The arithmetic operation unit is electrically connected to the correlator. A measurement object is disposed on an optical path between the pulse forming unit and the dispersion medium. The arithmetic operation unit estimates a wavelength dispersion amount of the measurement object based on the temporal waveform of the correlated light. The dispersion medium gives a group delay dispersion to the plurality of second optical pulses included in the optical pulse train to increase the peak intensity of the second optical pulse to be equal to or greater than the detection threshold value. The phase pattern includes a pattern for giving a group delay dispersion having a sign opposite to the group delay dispersion of the dispersion medium to the first light pulse.

According to another aspect of the present disclosure, a dispersion measuring method includes an output step, a pulse forming step, a dispersion medium transmission step, a detection step, and an arithmetic operation step. In the output step, a first optical pulse is output. In the pulse forming step, an optical pulse train is formed from the first optical pulse by using a spatial light modulator that presents a phase pattern for generating modulated light by applying a predetermined phase shift for each wavelength to the first optical pulse, the optical pulse train being modulated light including a plurality of second optical pulses having a time difference from each other and having center wavelengths different from each other. In the dispersion medium transmission step, the optical pulse train is transmitted through the measurement object, and then is transmitted through a dispersion medium having positive or negative group delay dispersion. In the detection step, the optical pulse train transmitted through the dispersion medium is received, correlated light including a plurality of third optical pulses that are cross-correlation or autocorrelation of the optical pulse train is generated, and a temporal waveform of the correlated light is detected. In the detection step, the temporal waveform of the correlated light formed from the optical pulse train having a peak intensity equal to or greater than a detection threshold value is detected. In the arithmetic operation step, a wavelength dispersion amount of the measurement object is estimated based on the temporal waveform of the correlated light. The phase pattern includes a phase pattern for giving a group delay dispersion having a sign opposite to the group delay dispersion of the dispersion medium to the first optical pulse.

According to still another aspect of the present disclosure, a dispersion measuring device includes a light source, a pulse forming unit, a correlation optical system, a dispersion medium, a detector, and an arithmetic operation unit. The light source outputs a first optical pulse. The pulse forming unit includes a spatial light modulator that presents a phase pattern for generating modulated light by applying a predetermined phase shift for each wavelength to the first optical pulse. The pulse forming unit forms, from the first optical pulse, an optical pulse train that is modulated light including a plurality of second optical pulses having a time difference from each other and having center wavelengths different from each other. The correlation optical system receives an optical pulse train and outputs correlated light including a plurality of third optical pulses that are cross-correlation or autocorrelation of the optical pulse train. The dispersion medium has a positive or negative group delay dispersion and receives the correlated light. The detector receives the correlated light transmitted through the dispersion medium and detects a temporal waveform of the correlated light having a peak intensity equal to or greater than a detection threshold value. The arithmetic operation unit is electrically connected to the detector. A measurement object is disposed on an optical path between the pulse forming unit and the correlation optical system. The arithmetic operation unit estimates a wavelength dispersion amount of the measurement object based on the temporal waveform of the correlated light. The dispersion medium gives a group delay dispersion to a plurality of third optical pulses included in the correlated light to increase peak intensities of the plurality of third optical pulses to be equal to or greater than the detection threshold value. The phase pattern includes a pattern for giving a group delay dispersion having a sign opposite to the group delay dispersion of the dispersion medium to the first light pulse.

According to still yet another aspect of the present disclosure, a dispersion measuring method includes an output step, a pulse forming step, a correlated-light output step, a dispersion medium transmission step, a detection step, and an arithmetic operation step. In the output step, a first optical pulse is output. In the pulse forming step, an optical pulse train is formed from the first optical pulse by using a spatial light modulator that presents a phase pattern for generating modulated light by applying a predetermined phase shift for each wavelength to the first optical pulse, the optical pulse train being modulated light including a plurality of second optical pulses having a time difference from each other and having center wavelengths different from each other. In the correlated-light output step, correlated light including a plurality of third optical pulses that are cross-correlation or autocorrelation of the optical pulse train is output after the optical pulse train is transmitted through a measurement object. In the dispersion medium transmission step, the correlated light is transmitted through a dispersion medium having a positive or negative group delay dispersion. In the detection step, a temporal waveform of the correlated light transmitted through the dispersion medium is detected. In the arithmetic operation step, a wavelength dispersion amount of the measurement object is estimated based on the temporal waveform of the correlated light. In the detection step, the temporal waveform of the correlated light having a peak intensity equal to or greater than a detection threshold value is detected. In the dispersion medium transmission step, when the correlated light is transmitted through the dispersion medium, a group delay dispersion is given to the plurality of third optical pulses included in the correlated light, so that peak intensities of the plurality of third optical pulses are increased to be equal to or greater than the detection threshold value. The phase pattern includes a pattern for giving a group delay dispersion having a sign opposite to the group delay dispersion of the dispersion medium to the first optical pulse.

In these devices and methods, a positive or negative group delay dispersion is given to the first optical pulse in the pulse forming unit (pulse forming step). As a result, the peak intensity of the second optical pulse is suppressed. Thus, it is possible to avoid an influence on the second optical pulse in the measurement object in a case where the peak intensity of the second optical pulse is large. For example, the peak intensity of the second optical pulse propagating in the measurement object can be made equal to or smaller than a threshold value of the non-linear optical phenomenon. Then, after the second pulse is transmitted through the measurement object, a group delay dispersion having a sign opposite to the group delay dispersion given to the first optical pulse is given to the second pulse or the third pulse by the dispersion medium. Therefore, the peak intensity of the second pulse or the third pulse after being transmitted through the measurement object can be made equal to or greater than the detection threshold value of the correlator or the detector. This makes it possible to accurately detect the temporal waveform of the correlated light. From the above, it is possible to more accurately measure the wavelength dispersion amount of the measurement object.

In the above devices and methods, the group delay dispersion given from the phase pattern may be a negative group delay dispersion, and the group delay dispersion given from the dispersion medium may be a positive group delay dispersion. Many types of dispersion media give the positive group delay dispersion. Therefore, according to the above devices and methods, it is possible to select more types of dispersion media as the dispersion medium in the above-described devices and methods, as compared with a case where the group delay dispersion given from the dispersion medium is the negative group delay dispersion.

In the above devices and methods, the phase pattern may be a phase pattern for giving the group delay dispersion in which the peak intensities of the plurality of second optical pulses fall below the threshold value of the non-linear optical phenomenon to the first optical pulse in the measurement object. According to the devices and methods, since the occurrence of the non-linear optical phenomenon is suppressed, it is possible to suppress the distortion of the temporal waveforms of the plurality of second optical pulses, and eventually suppress the distortion of the temporal waveform of the correlated light.

In the above devices and methods, the dispersion medium may be made of a material in which the non-linear optical phenomenon does not occur.

In the above devices and methods, the dispersion medium may be an optical fiber, an optical waveguide, a semiconductor, a dielectric optical crystal, a grating pair, a prism pair, or a glass body.

In the above devices and methods, the dispersion medium may be a single mode fiber, a multi-mode fiber, a rare-earth-doped fiber, a photonic crystal fiber, a dispersion shifted fiber, or a double clad fiber.

In the above devices and methods, the dispersion medium may be a semiconductor waveguide containing SiN or InP.

In the above devices and methods, the dispersion medium may be diamond, $SiO_2$, $LiNbO_3$, $LiTaO_3$, lanthanum-doped lead zirconate titanate, Si, Ge, fullerene, graphite, graphene, carbon nanotube, GaN, GaAs, a magnetic body, an organic material, or a polymer material.

Advantageous Effects of Invention

According to the dispersion measuring device and the dispersion measuring method according to the aspect of the present disclosure, it is possible to more accurately measure a wavelength dispersion amount of a measurement object.

BRIEF DESCRIPTION OF DRAWINGS

FIG. 6 is a diagram illustrating an example of a relationship between a group delay dispersion given to an optical pulse and a peak intensity of the optical pulse.

Figure 8:
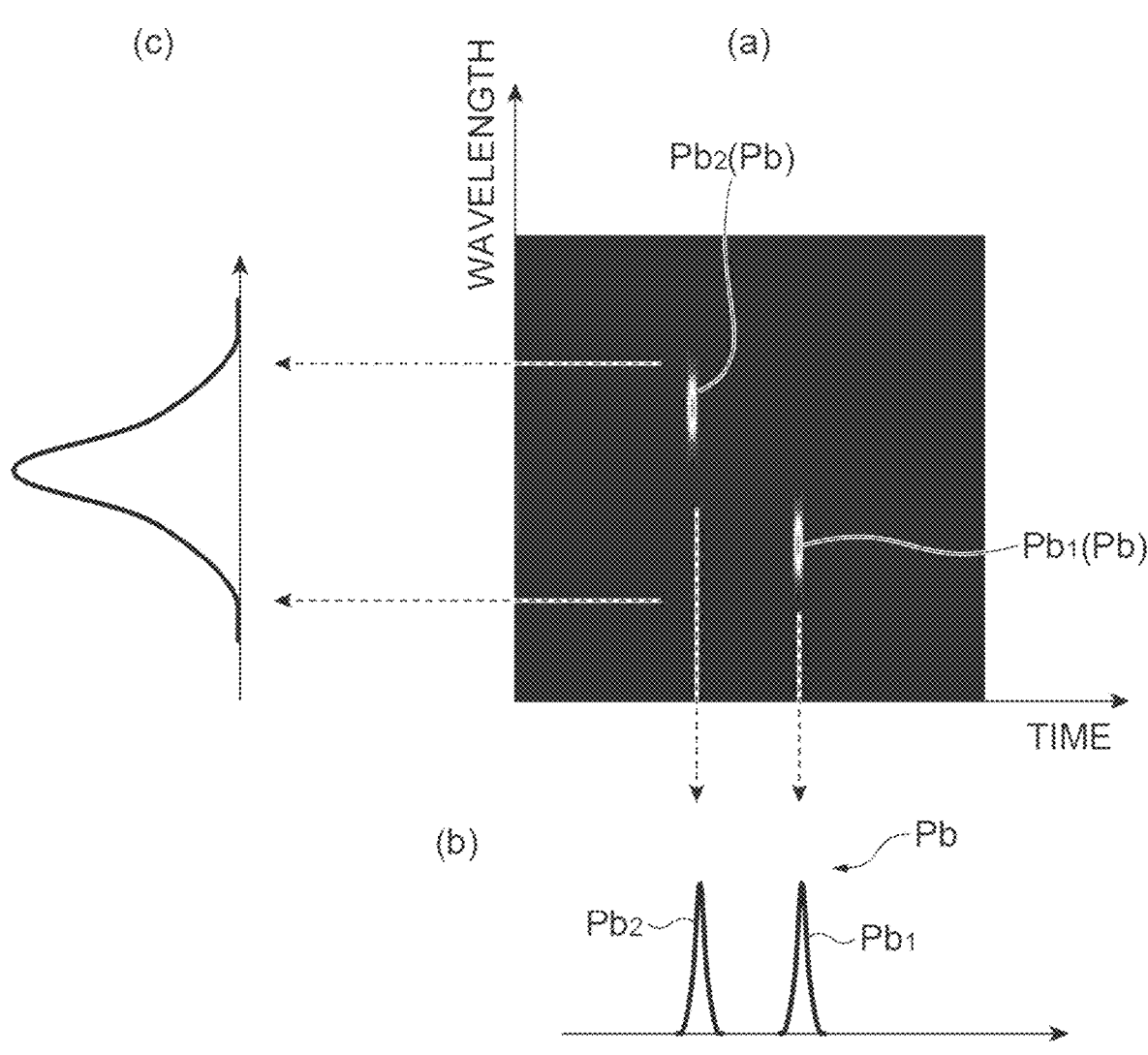

(a), (b), and (c) of FIG. 8 are diagrams illustrating examples of a band-controlled multi-pulse.

Figure 9:
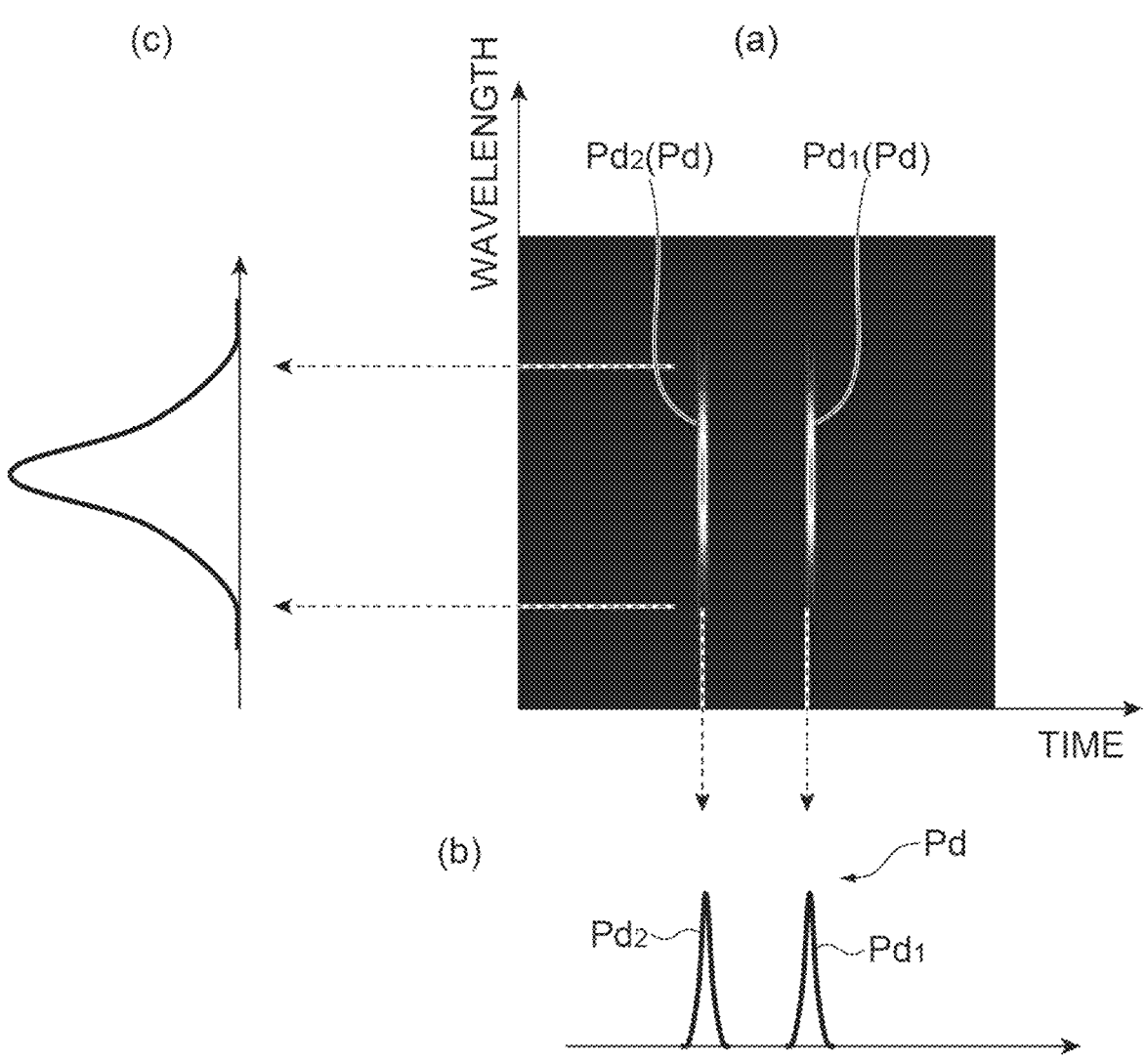

(a), (b), and (c) of FIG. 9 are diagrams illustrating examples of a multi-pulse of which a band is not controlled, as a comparative example.

Figure 10:
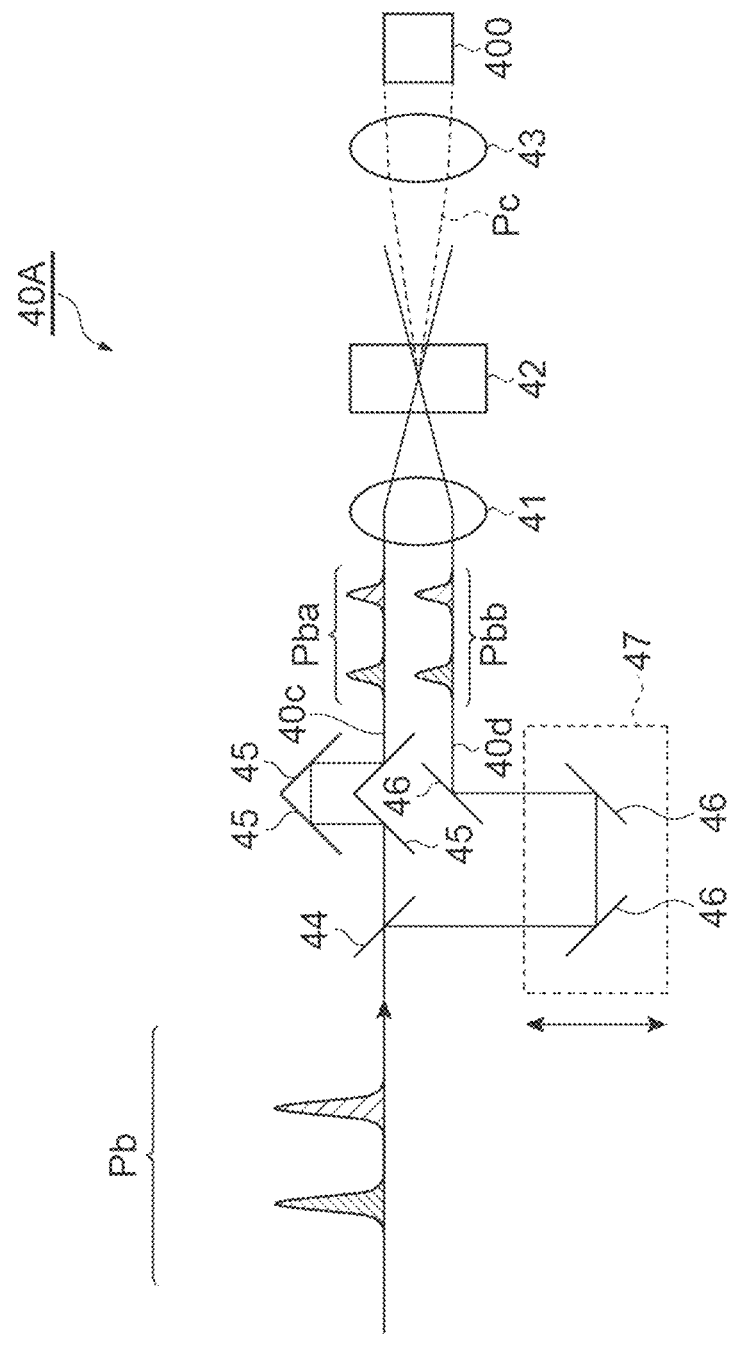

FIG. 10 is a schematic diagram illustrating a correlation optical system for generating correlated light including autocorrelation of an optical pulse train, as a configuration example of the correlation optical system.

Figure 11:
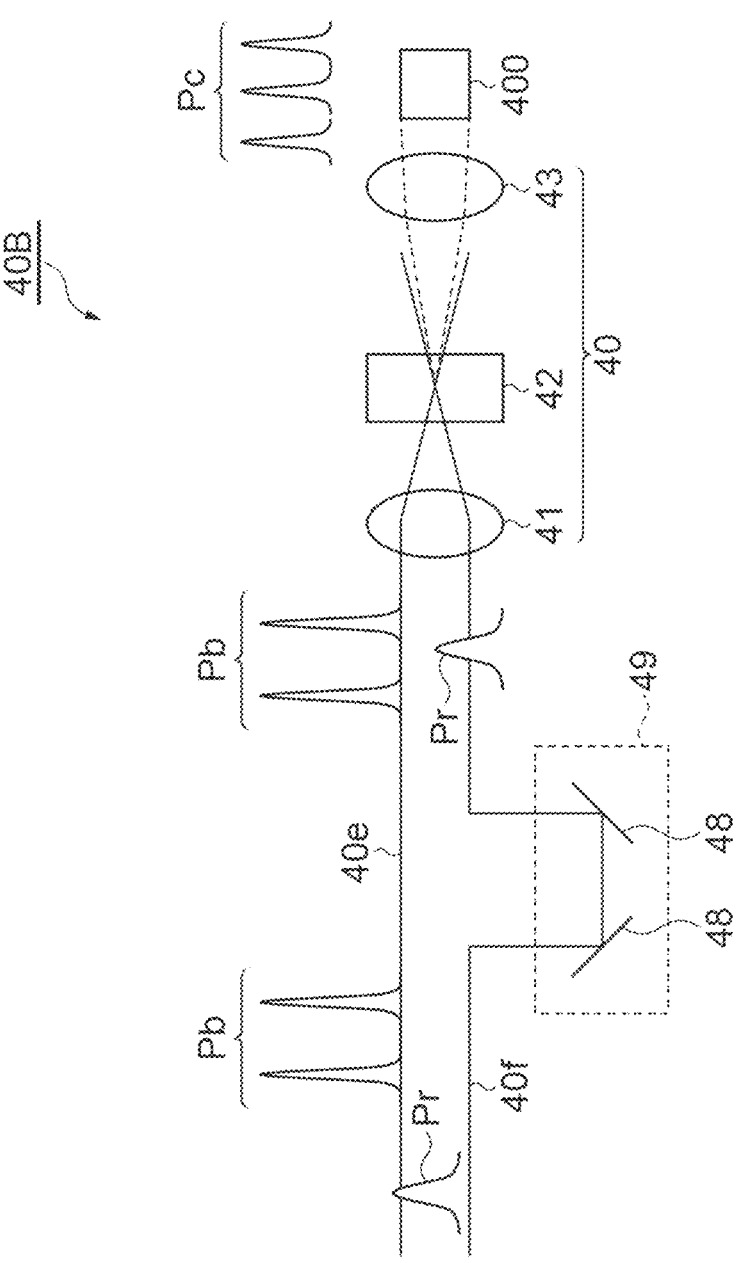

FIG. 11 is a schematic diagram illustrating a correlation optical system for generating correlated light including cross-correlation of an optical pulse train, as another configuration example of the correlation optical system.

Figure 12:
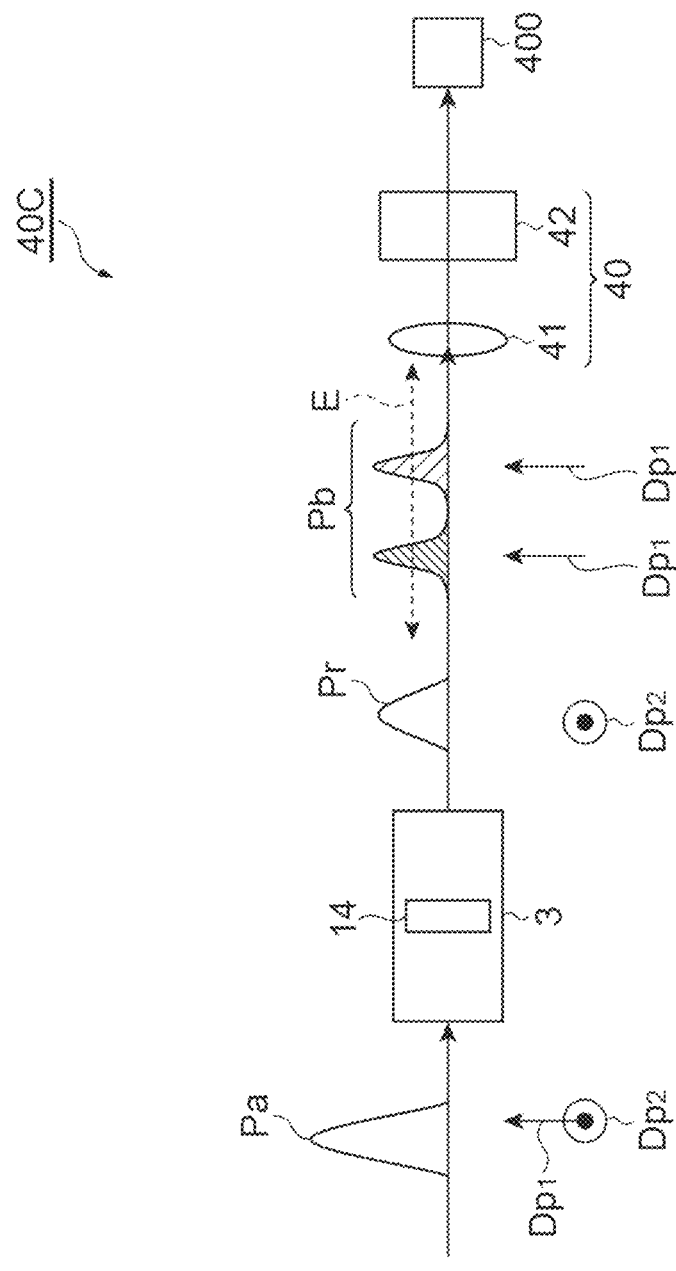

FIG. 12 is a schematic diagram illustrating a correlation optical system for generating correlated light including cross-correlation of an optical pulse train, as still another configuration example of the correlation optical system.

FIG. 13 is a view for conceptually describing a feature amount of the correlated light. (a) of FIG. 13 illustrates an example of a temporal waveform of the correlated light in a case where a wavelength dispersion of an optical component is zero. (b) of FIG. 13 illustrates an example of the temporal waveform of the correlated light in a case where the wavelength dispersion of the optical component is not zero.

Figure 14:
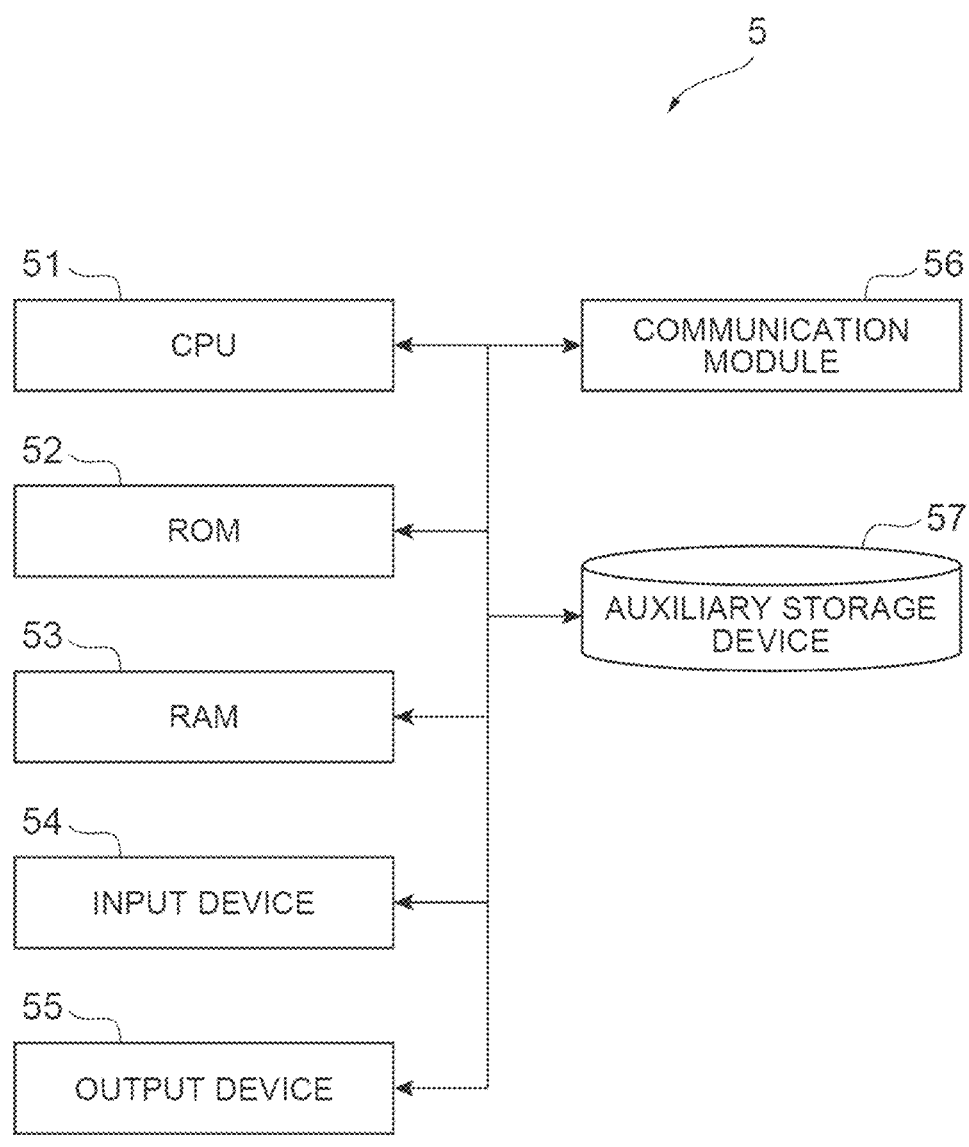

FIG. 14 is a schematic diagram illustrating a configuration example of hardware of a control device.

Figure 15:
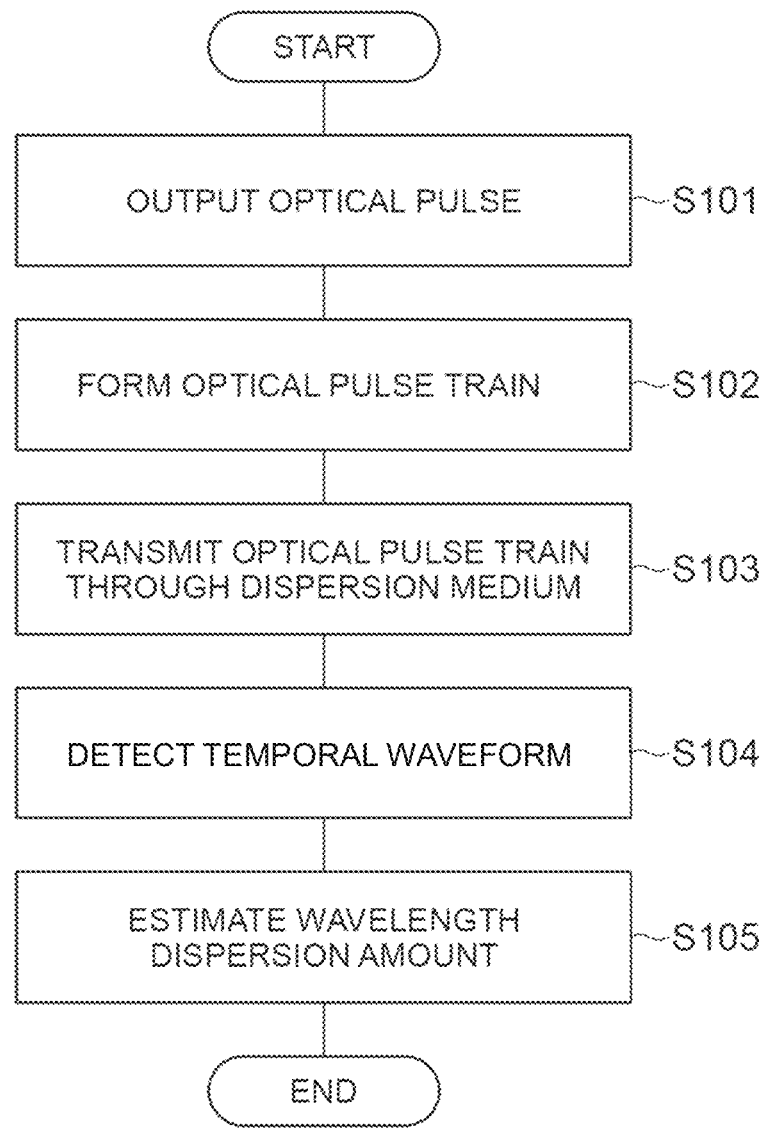

FIG. 15 is a flowchart illustrating a dispersion measuring method using the dispersion measuring device.

(a) of FIG. 16 illustrates a spectral waveform of a single-pulsed optical pulse. (b) of FIG. 16 illustrates a temporal intensity waveform of the optical pulse.

(a) of FIG. 17 illustrates a spectral waveform of output light from the pulse forming unit when rectangular wave-shaped phase spectrum modulation is applied in the SLM. (b) of FIG. 17 illustrates a temporal intensity waveform of the output light from the pulse forming unit.

Figure 18:
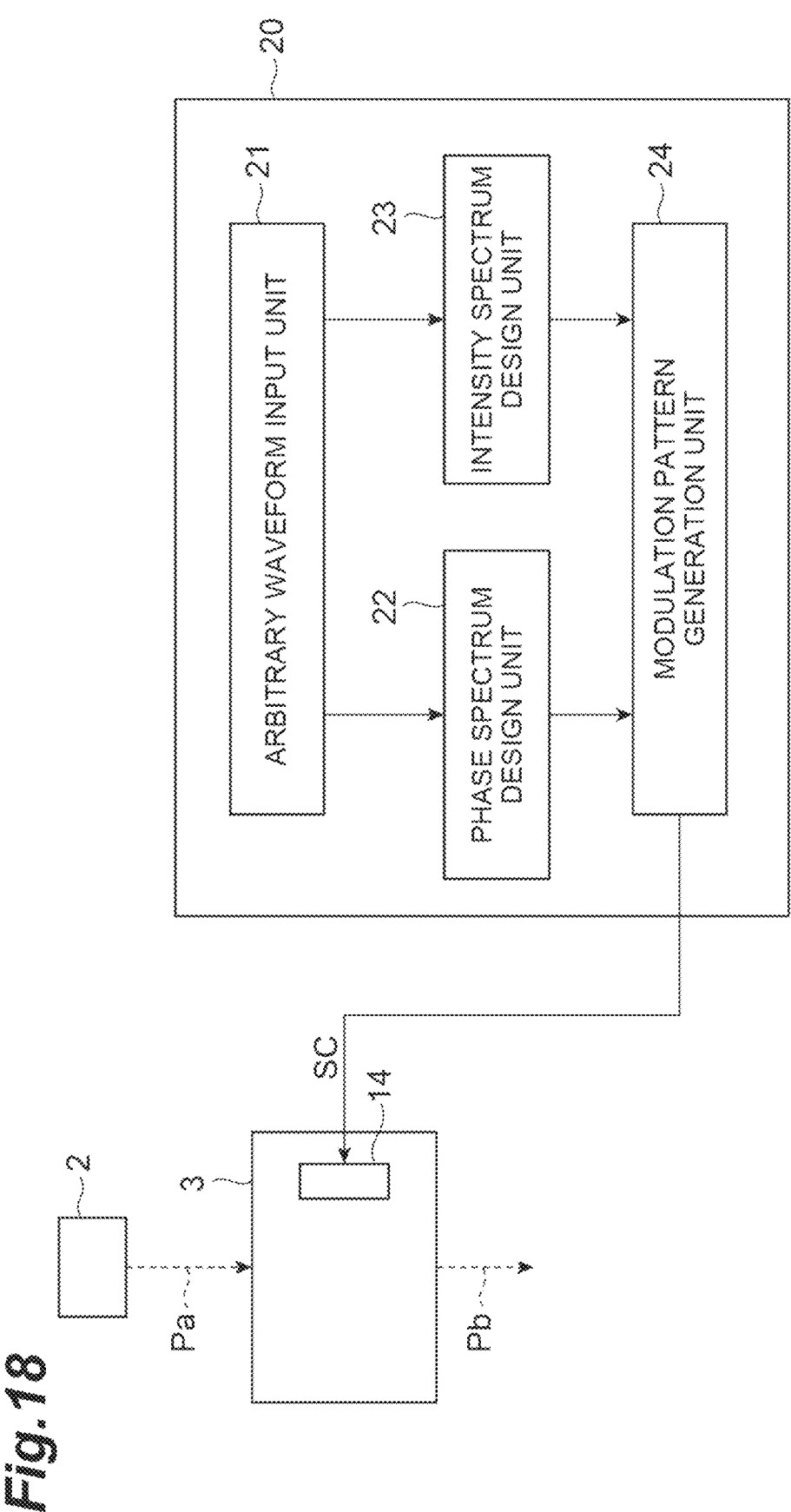

FIG. 18 is a diagram illustrating a configuration of a device that performs an arithmetic operation of a modulation pattern of the SLM.

Figure 19:
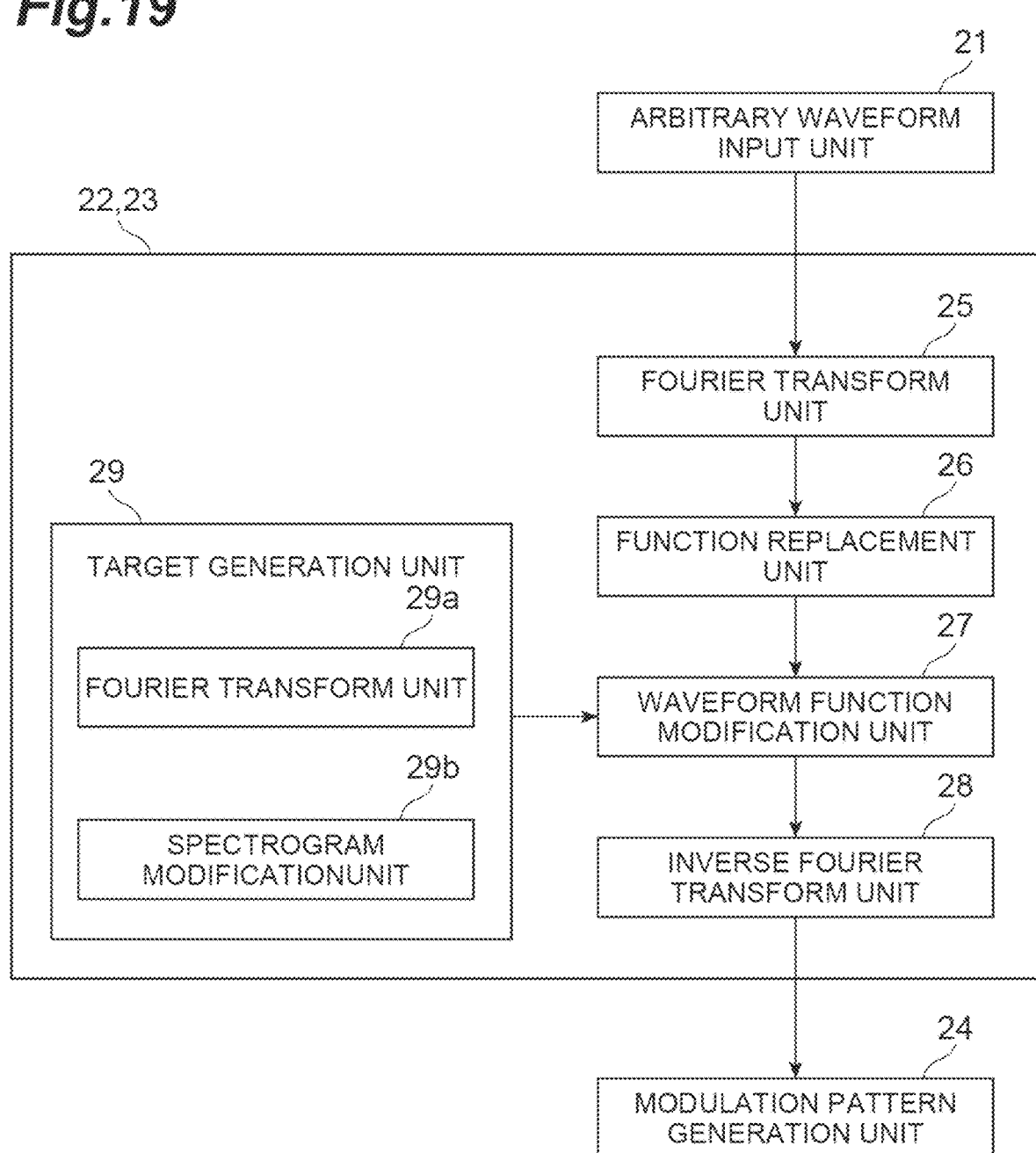

FIG. 19 is a block diagram illustrating internal configurations of a phase spectrum design unit and an intensity spectrum design unit.

Figure 20:
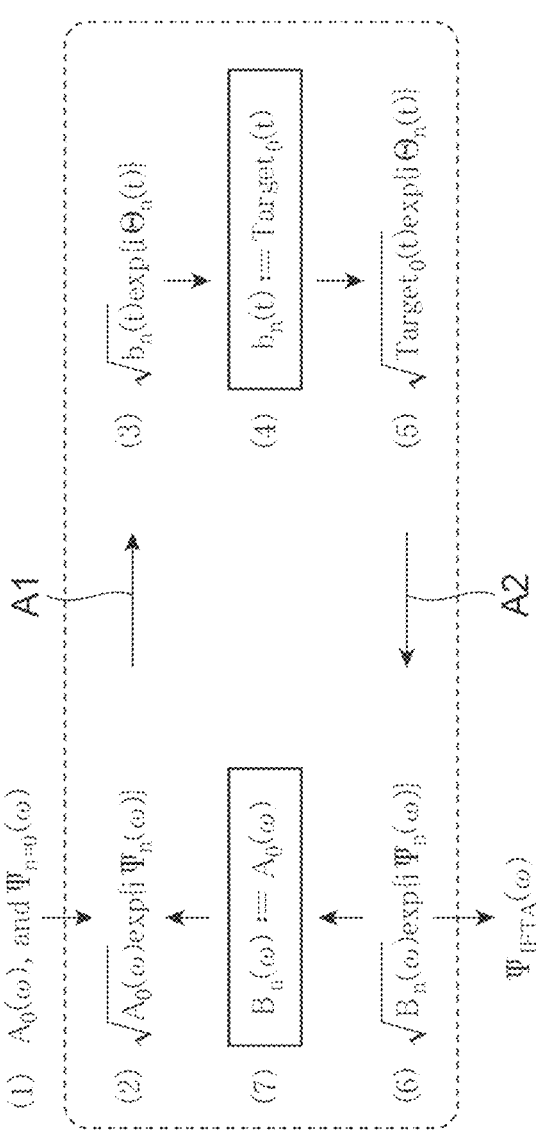

FIG. 20 is a diagram illustrating a calculation procedure of a phase spectrum by an iterative Fourier transform method.

Figure 21:
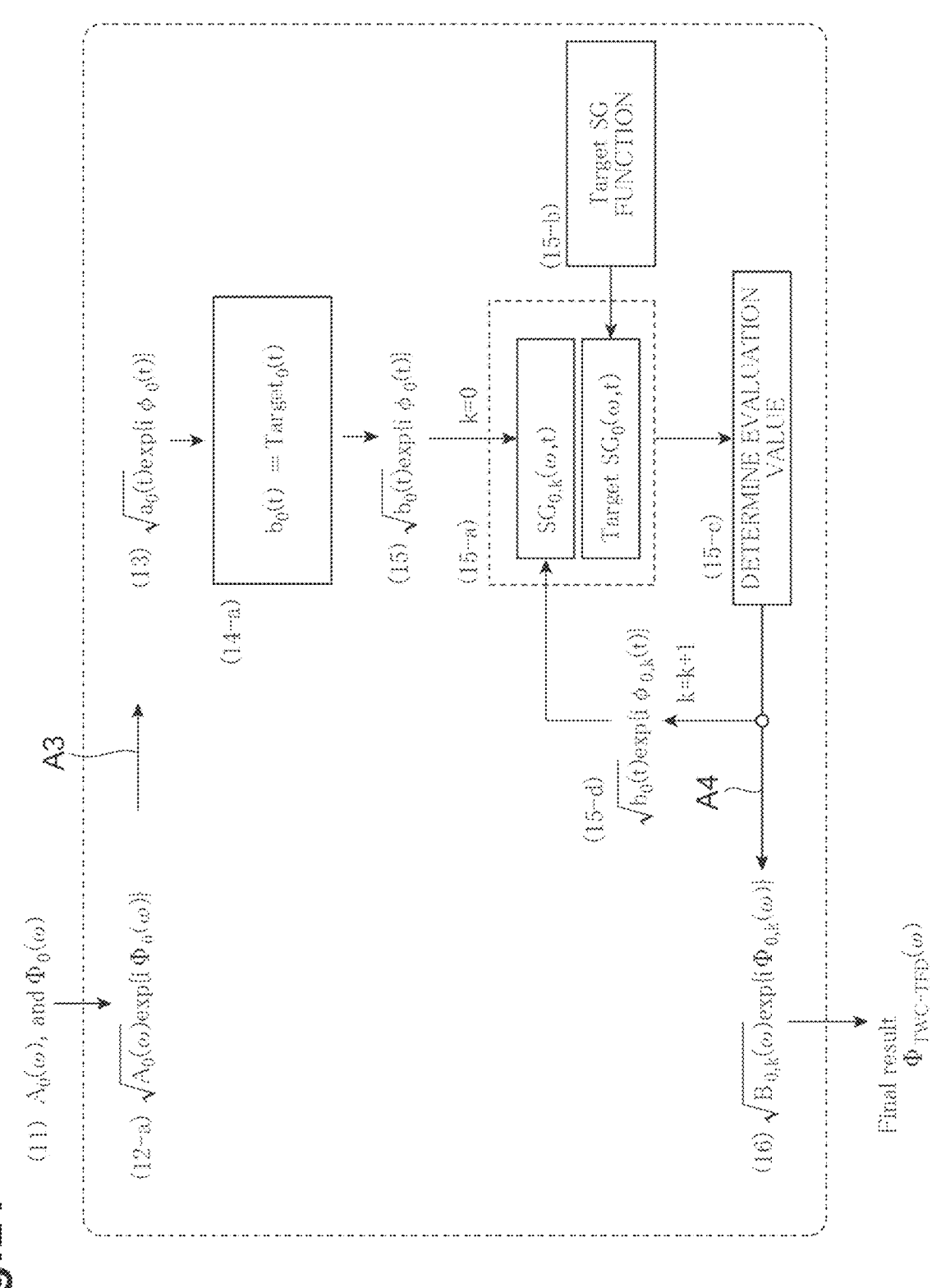

FIG. 21 is a diagram illustrating a calculation procedure of a phase spectrum function in the phase spectrum design unit.

FIG. 22 is a diagram illustrating a calculation procedure of an intensity spectrum function in the intensity spectrum design unit.

Figure 23:
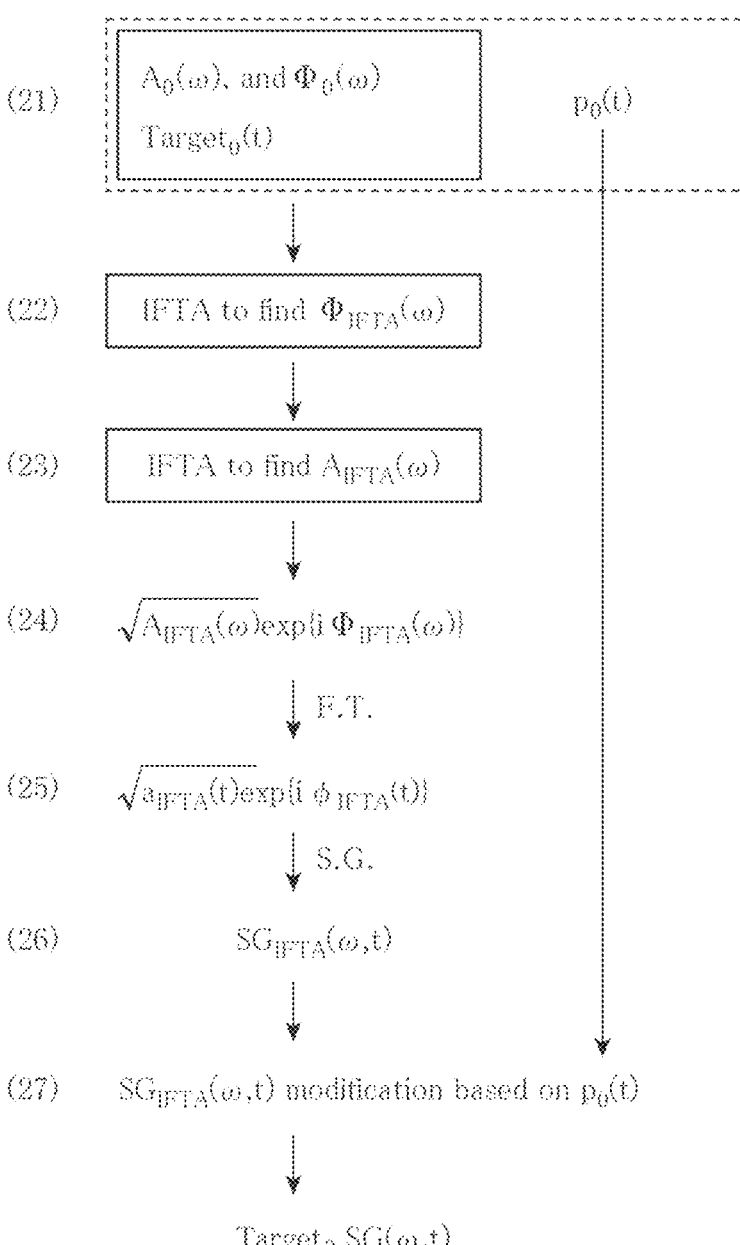

FIG. 23 is a diagram illustrating an example of a generation procedure of a target spectrogram in a target generation unit.

Figure 24:
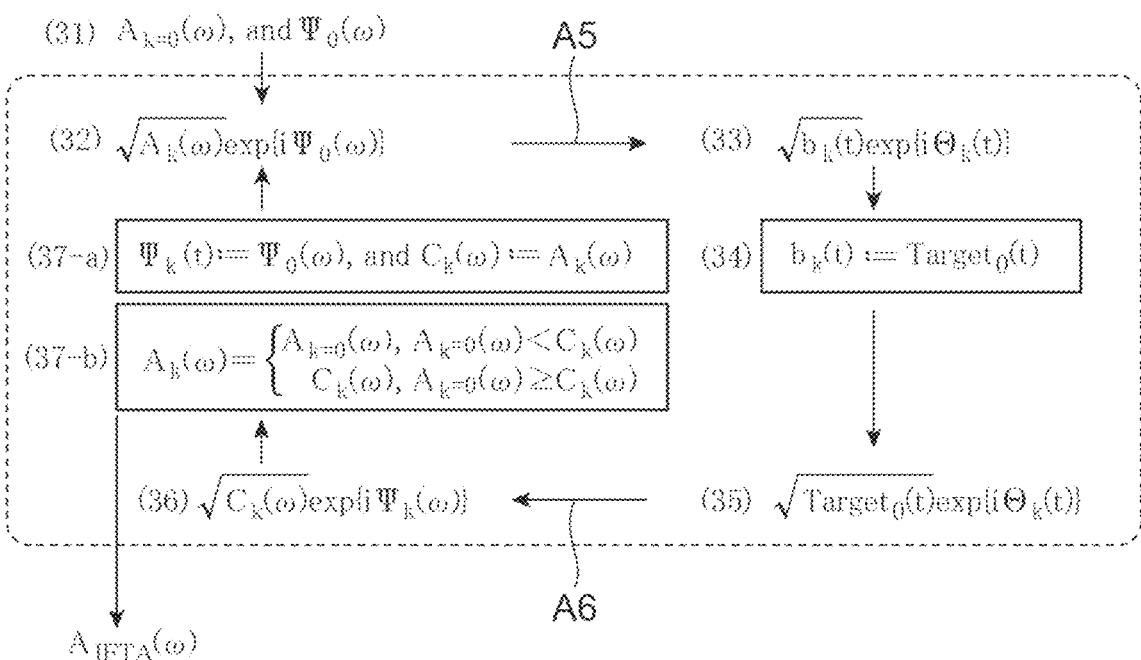

FIG. 24 is a diagram illustrating an example of a procedure of calculating the intensity spectrum function.

(a) of FIG. 25 is a diagram illustrating a spectrogram. (b) of FIG. 25 is a diagram illustrating a target spectrogram in which the spectrogram is changed.

Figure 26:
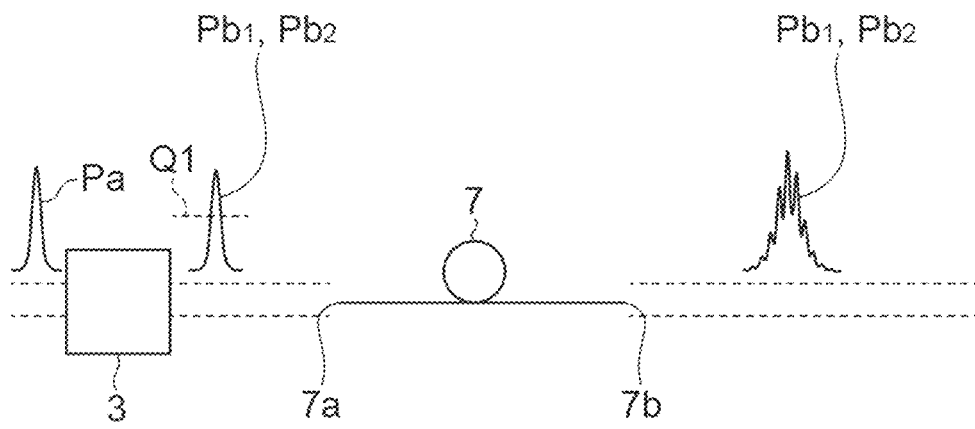

FIG. 26 is a diagram illustrating an example of an intensity change in the temporal waveform of the optical pulse in the dispersion measuring device according to the embodiment of the present disclosure.

Figure 27:
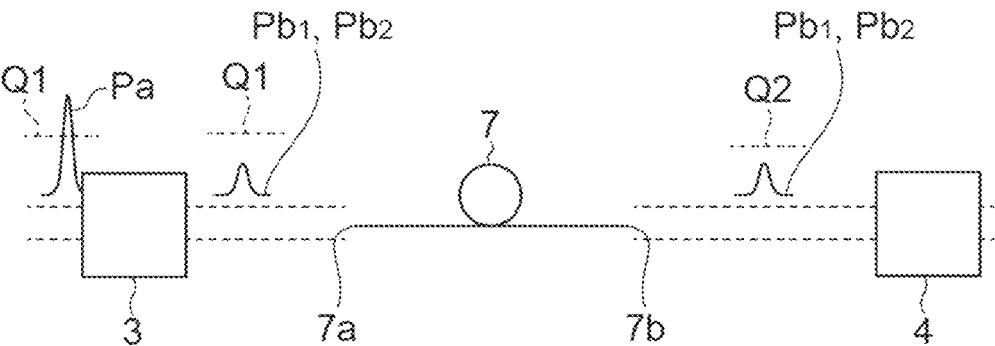

FIG. 27 is a diagram illustrating another example of the intensity change in the temporal waveform of the optical pulse in the dispersion measuring device according to the embodiment of the present disclosure.

Figure 28:
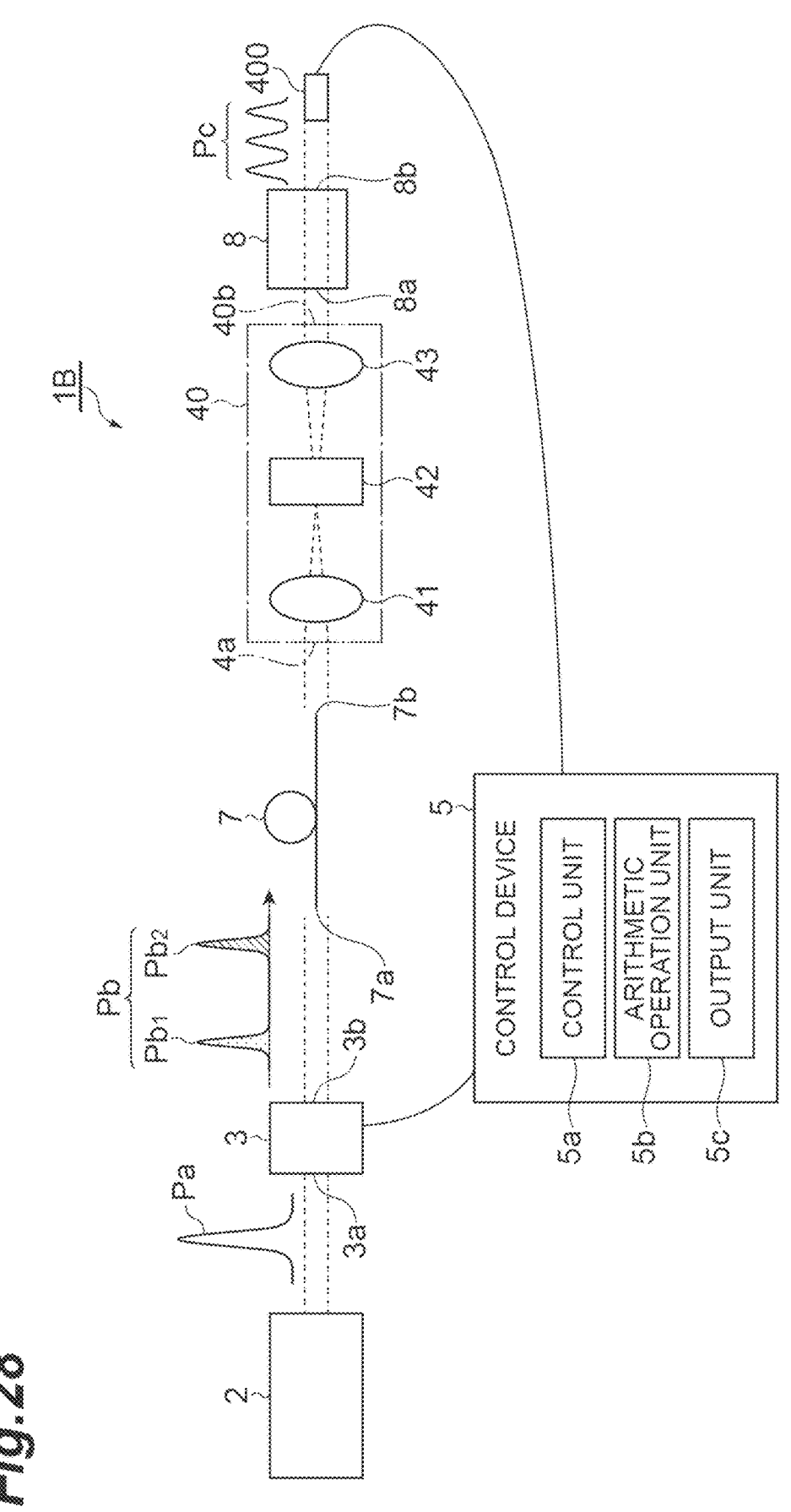

FIG. 28 is a diagram illustrating another configuration of the dispersion measuring device as a first modification.

Figure 29:
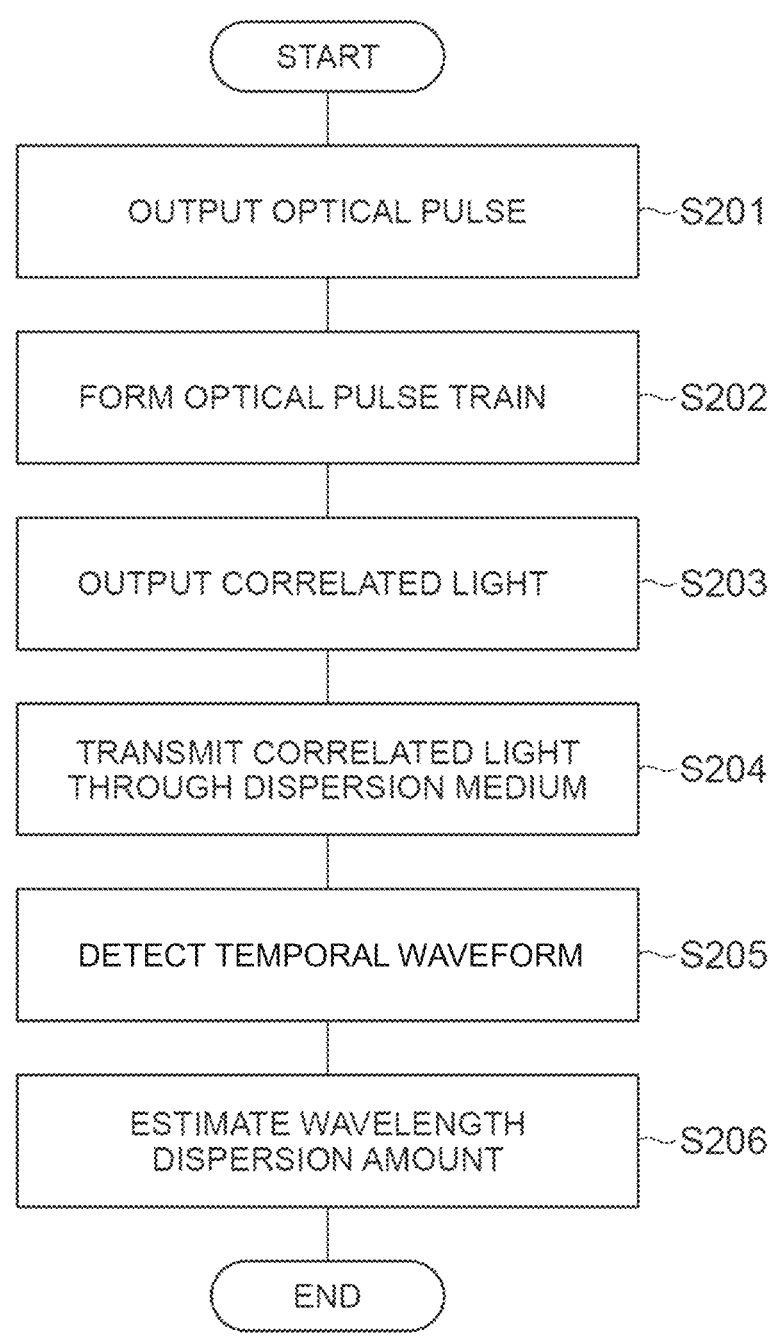

FIG. 29 is a flowchart illustrating a dispersion measuring method using the dispersion measuring device in the first modification.

DESCRIPTION OF EMBODIMENTS

Hereinafter, embodiments of a dispersion measuring device and a dispersion measuring method according to the present disclosure will be described in detail with reference to the accompanying drawings. The same elements are denoted by the same reference signs in description of drawings, and the repetitive descriptions are omitted.

Figure 1:
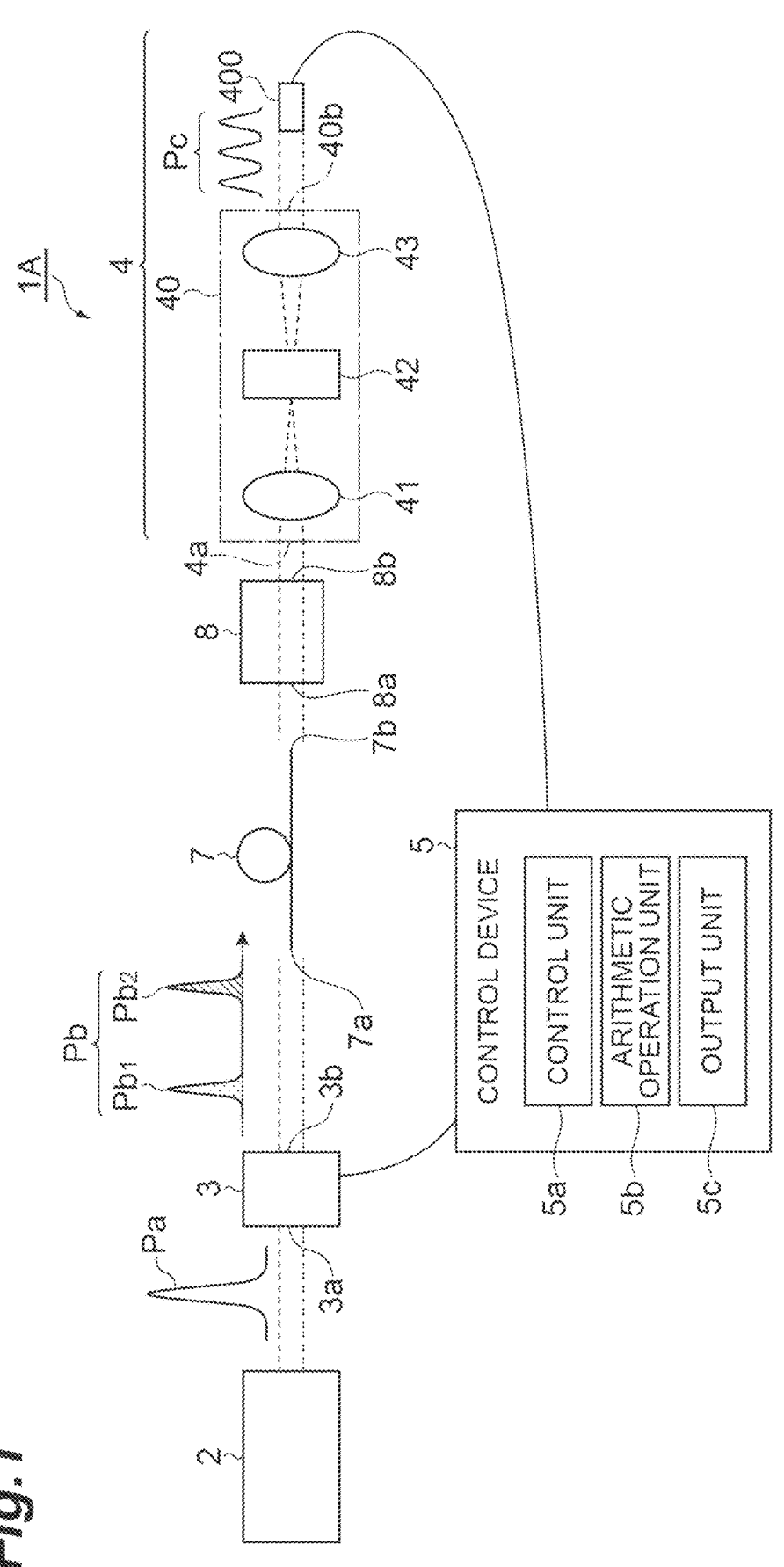
FIG. 1 is a schematic diagram illustrating a configuration of a dispersion measuring device according to an embodiment of the present disclosure.

FIG. 1 is a schematic diagram illustrating a configuration of a dispersion measuring device 1A according to an embodiment of the present disclosure. The dispersion measuring device 1A is a device that measures a wavelength dispersion amount of an optical component 7 as a measurement object. The dispersion measuring device 1A includes a pulsed laser light source 2 (light source), a pulse forming unit 3, a dispersion medium 8, a correlator 4, and a control device 5. A light input end 3a of the pulse forming unit 3 is optically coupled to the pulsed laser light source 2 spatially or via an optical waveguide such as an optical fiber. A light input end 7a of the optical component 7 is optically coupled to a light output end 3b of the pulse forming unit 3 spatially or via an optical waveguide such as an optical fiber. A light input end 8a of the dispersion medium 8 is optically coupled to a light output end 7b of the optical component 7 spatially or via an optical waveguide such as an optical fiber. A light input end 4a of the correlator 4 is optically coupled to a light output end 8b of the dispersion medium 8 spatially or via an optical waveguide such as an optical fiber. The control device 5 is electrically connected to the pulse forming unit 3 and the correlator 4. The correlator 4 includes a correlation optical system 40 and a detector 400. A light output end 40b of the correlation optical system 40 is optically coupled to the detector 400 spatially or via an optical waveguide such as an optical fiber. The control device 5 includes a control unit 5a, an arithmetic operation unit 5b, and an output unit 5c.

The pulsed laser light source 2 outputs a coherent optical pulse Pa (first optical pulse). The pulsed laser light source 2 is, for example, a femtosecond laser, and is a solid-state laser light source such as an LD direct excitation Yb:YAG pulsed laser in an example. The temporal waveform of the optical pulse Pa has, for example, a Gaussian function shape. The full width at half maximum (FWHM) of the optical pulse Pa is, for example, in the range of 10 fs to 10,000 fs, and is 100 fs in an example. The optical pulse Pa is an optical pulse having a certain bandwidth and includes a plurality of continuous wavelength components. In an example, the bandwidth of the optical pulse Pa is 10 nm and the center wavelength of the optical pulse Pa is 1030 nm.

The pulse forming unit 3 is a part that forms an optical pulse train Pb from the optical pulse Pa. The optical pulse train Pb includes a plurality of optical pulses $Pb_1$ and $Pb_2$ (plurality of second optical pulses) having a time difference from each other and having different center wavelengths from each other. The optical pulse train Pb is a single pulse group generated by dividing a spectrum constituting the optical pulse Pa into a plurality of wavelength bands and using each wavelength band. At boundaries among the plurality of wavelength bands, the plurality of wavelength bands may overlap each other. In the following description, the optical pulse train Pb may be referred to as a "band-controlled multi-pulse".

Figure 2:
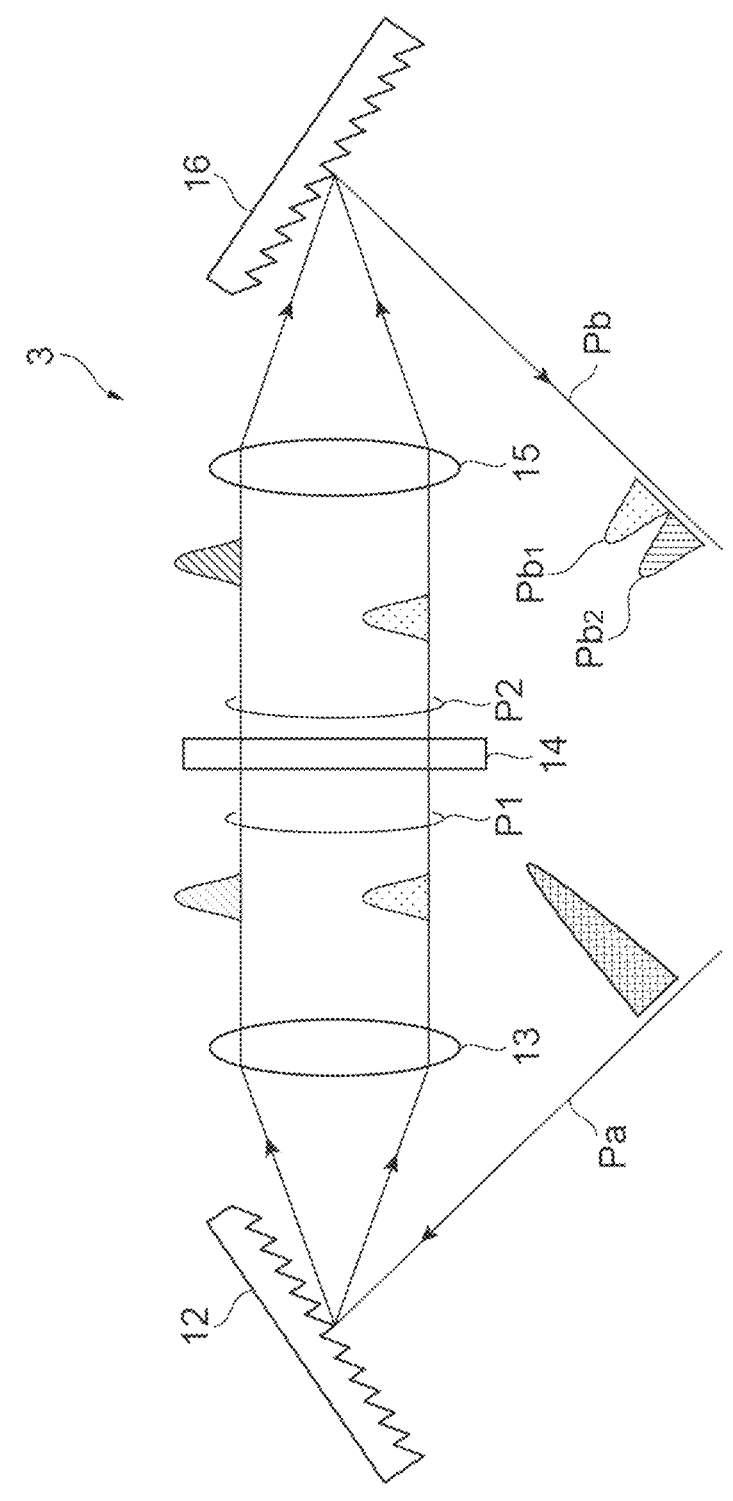
FIG. 2 is a diagram illustrating a configuration example of a pulse forming unit.

FIG. 2 is a diagram illustrating a configuration example of the pulse forming unit 3. The pulse forming unit 3 includes a diffraction grating 12, a lens 13, a spatial light modulator (SLM) 14, a lens 15, and a diffraction grating 16. The diffraction grating 12 is a spectroscopic element in the present embodiment, and is optically coupled to the pulsed laser light source 2. The SLM 14 is optically coupled to the diffraction grating 12 via the lens 13. The diffraction grating 12 spatially separates a plurality of wavelength components included in the optical pulse Pa from each other for each wavelength. As the spectroscopic element, another optical component such as a prism may be used instead of the diffraction grating 12. The optical pulse Pa obliquely enters to the diffraction grating 12 and is dispersed into a plurality of wavelength components. Light P1 including the plurality of wavelength components is focused by the lens 13 for each wavelength component, and an image is formed on the modulation surface of the SLM 14. The lens 13 may be a convex lens made of a light transmitting member or a concave mirror having a concave light reflection surface.

The SLM 14 applies a predetermined phase shift for each wavelength to the optical pulse Pa in order to convert the optical pulse Pa into the optical pulse train Pb (modulated light). Specifically, the SLM 14 receives a control signal from the control unit 5a (see FIG. 1) in order to generate the optical pulse train Pb by applying a phase shift to the optical pulse Pa. The SLM 14 presents a phase pattern by receiving the control signal output from the control unit 5a. The SLM 14 simultaneously performs phase modulation and intensity modulation of the light P1 by using the presented phase pattern. In this manner, the SLM 14 shifts the phases of the plurality of wavelength components output from the diffraction grating 12 from each other. The SLM 14 may perform only phase modulation or only intensity modulation. The SLM 14 is, for example, a phase modulation type. In an example, the SLM 14 is a liquid crystal on silicon (LCOS) type. Although the transmissive SLM 14 is illustrated in the drawings, the SLM 14 may be a reflective type.

Figure 3:
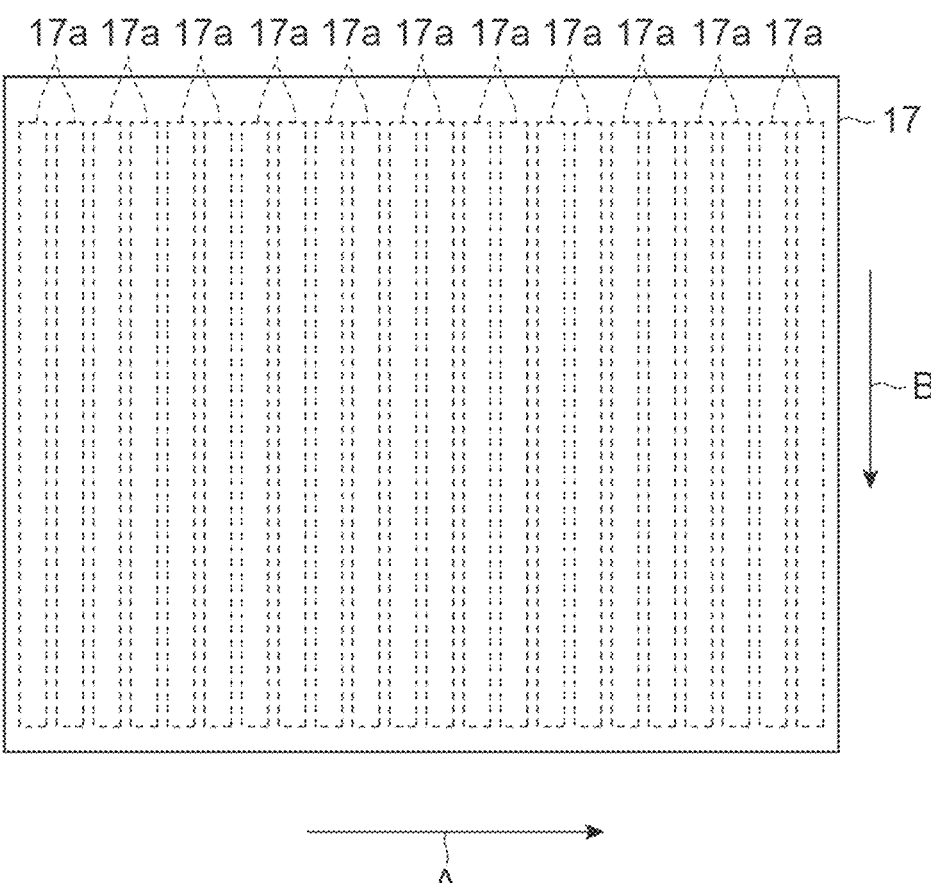
FIG. 3 is a diagram illustrating a modulation surface of an SLM.

FIG. 3 is a diagram illustrating the modulation surface 17 of the SLM 14. As illustrated in FIG. 3, on the modulation surface 17, a plurality of modulation regions 17a are arranged along a certain direction A, and each modulation region 17a extends in a direction B intersecting the direction A. The direction A is a spectral direction by the diffraction grating 12. The modulation surface 17 functions as a Fourier transform surface, and each corresponding wavelength component after being dispersed is incident on each of the plurality of modulation regions 17a. The SLM 14 modulates the phase and the intensity of each incident wavelength component independently from the other wavelength components in each modulation region 17a. Since the SLM 14 in the present embodiment is the phase modulation type, the intensity modulation is realized by the phase pattern (phase image) presented on the modulation surface 17.

Each wavelength component of the modulated light P2 modulated by the SLM 14 is focused at a point on the diffraction grating 16 by the lens 15. At this time, the lens 15 functions as a focusing optical system for focusing the modulated light P2. The lens 15 may be a convex lens made of a light transmitting member or a concave mirror having a concave light reflection surface. The diffraction grating 16 functions as a combining optical system and combines the modulated wavelength components. That is, the plurality of wavelength components of the modulated light P2 are focused and combined with each other by the lens 15 and the diffraction grating 16 to obtain a band-controlled multi-pulse (optical pulse train Pb).

Figure 4:
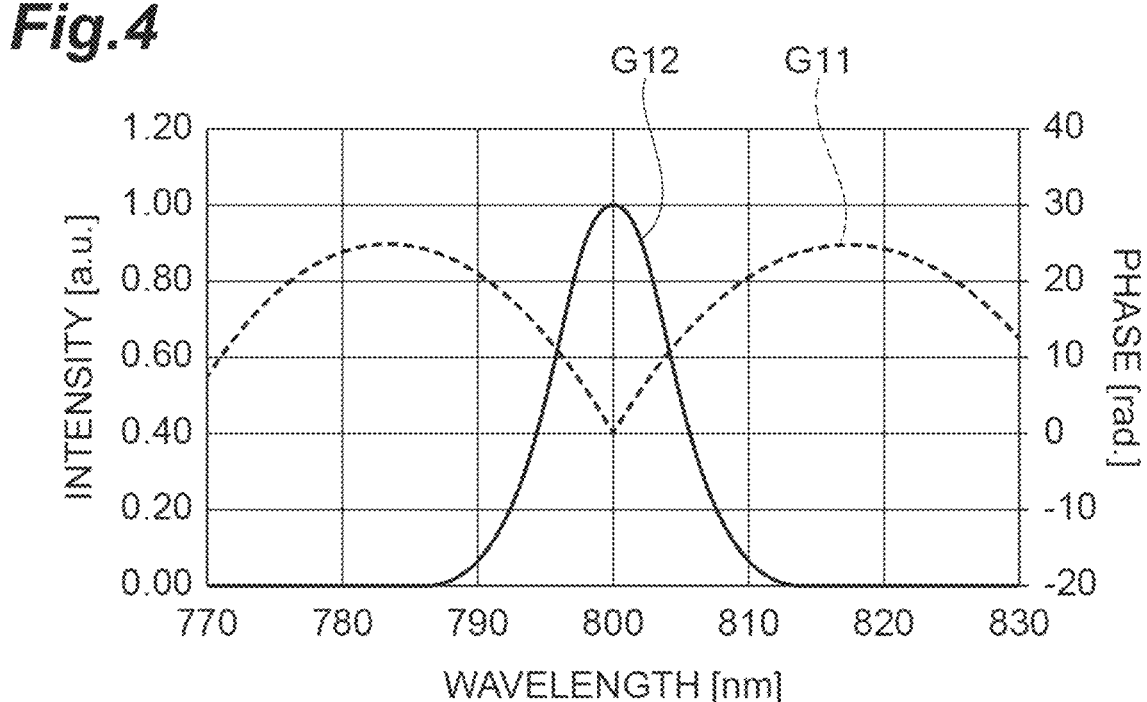
FIG. 4 is a diagram illustrating an example of a phase pattern presented to the SLM.
Figure 5:
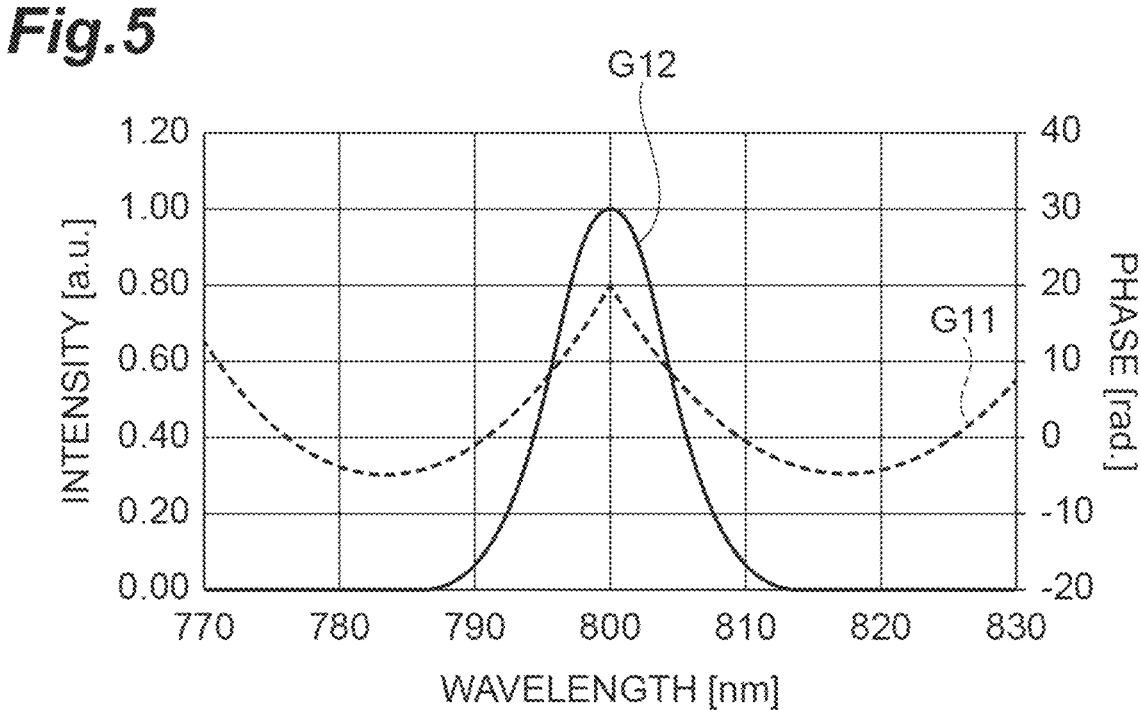
FIG. 5 is a diagram illustrating an example of the phase pattern presented to the SLM.

The phase pattern presented on the modulation surface 17 is such that a phase pattern for giving a positive (normal) or negative (anomalous) group delay dispersion (GDD) to the optical pulse Pa, that is, for making the optical pulse train Pb have a positive or negative group delay dispersion, is superimposed on a phase pattern for generating the optical pulse train Pb. FIGS. 4 and 5 illustrate examples of a spectral waveform (spectrum phase G11 and spectrum intensity G12) of output light from the pulse forming unit 3. In FIGS. 4 and 5, the horizontal axis indicates the wavelength (nm), the left vertical axis indicates the intensity value (arbitrary unit) of an intensity spectrum, and the right vertical axis indicates the phase value (rad) of a phase spectrum. The spectral waveform illustrated in FIG. 4 illustrates a case where a negative group delay dispersion is given. The spectral waveform illustrated in FIG. 5 illustrates a case where a positive group delay dispersion is given.

By giving the positive or negative group delay dispersion to the optical pulse Pa incident on the modulation surface 17, the peak intensities of the temporal waveform of the optical pulses $Pb_1$ and $Pb_2$ change. FIG. 6 is a diagram illustrating an example of a relationship between the group delay dispersion given to the optical pulse Pa by the modulation surface 17 and the peak intensities of the optical pulses $Pb_1$ and $Pb_2$. In FIG. 6, the vertical axis indicates the peak intensities of the optical pulses $Pb_1$ and $Pb_2$, and the horizontal axis indicates the group delay dispersion given to the optical pulse Pa by the modulation surface 17. As illustrated in FIG. 6, the peak intensities of the optical pulses $Pb_1$ and $Pb_2$ depend on the group delay dispersion. That is, in a case where the group delay dispersion is zero, the peak intensities of the optical pulses $Pb_1$ and $Pb_2$ are maximized. The peak intensities of the optical pulses $Pb_1$ and $Pb_2$ decrease as the absolute value of the group delay dispersion increases. Thus, by giving the positive or negative group delay dispersion to the optical pulse Pa on the modulation surface 17, it is possible to reduce the peak intensities of the optical pulses $Pb_1$ and $Pb_2$ as compared with a case where the group delay dispersion is not given. In the description of the present embodiment, the "peak intensity of the optical pulse" means the peak intensity of the optical pulse in the time domain unless otherwise specified. When the group delay dispersion is given to the optical pulse Pa on the modulation surface 17, the peak intensities of the optical pulses $Pb_1$ and $Pb_2$ in the time domain are reduced while the intensities of the optical pulses $Pb_1$ and $Pb_2$ in the spectrum domain are maintained.

The phase pattern presented on the modulation surface 17 is a phase pattern for giving, to the optical pulse Pa, the group delay dispersion in which the maximum intensities of the optical pulses $Pb_1$ and $Pb_2$ fall below the threshold value of the non-linear optical phenomenon in the optical component 7. As described above, when the phase pattern gives the positive or negative group delay dispersion to the optical pulse Pa, the peak intensity of the optical pulse train Pb output from the pulse forming unit 3 is reduced. Then, by sufficiently increasing the absolute value of the group delay dispersion given to the optical pulse Pa, the peak intensities of the optical pulses $Pb_1$ and $Pb_2$ propagating through the optical component 7 can fall below the threshold value of the non-linear optical phenomenon. The sign of the group delay dispersion is equal to the sign of a group velocity dispersion which is the group delay dispersion per unit length.

Figure 7:
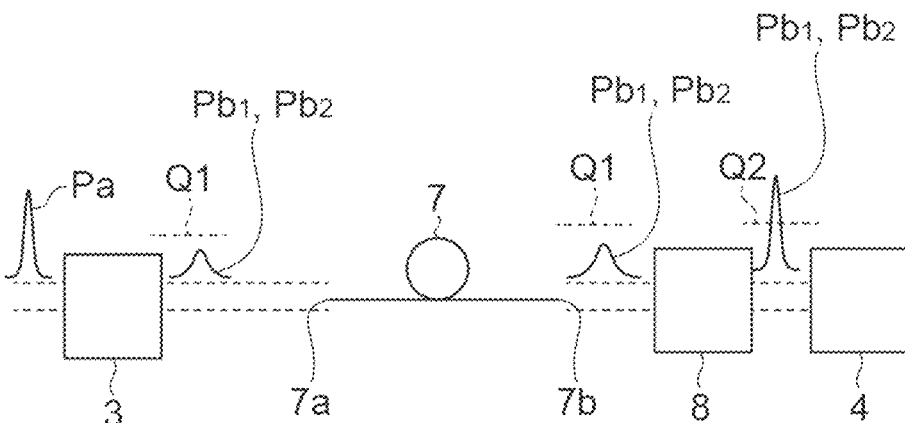
FIG. 7 is a conceptual diagram illustrating how a peak intensity in a temporal waveform of an optical pulse changes.

FIG. 7 is a conceptual diagram illustrating how the peak intensities of the optical pulses $Pb_1$ and $Pb_2$ change. As illustrated in FIG. 7, by giving the positive or negative group delay dispersion to the optical pulse Pa in the pulse forming unit 3, the peak intensities of the optical pulses $Pb_1$ and $Pb_2$ fall below the threshold value Q1 of the non-linear optical phenomenon of the optical component 7. In a case where the optical component 7 is a long-distance optical waveguide such as an optical fiber, the peak intensities of the optical pulses $Pb_1$ and $Pb_2$ further change due to the group delay dispersion of the optical component 7. In such a case, in both the light input end 7a and the light output end 7b of the optical component 7, the peak intensities of the optical pulses $Pb_1$ and $Pb_2$ is preferably lower than the threshold value Q1 of the non-linear optical phenomenon.

The SLM 14 forms the optical pulse train Pb including the optical pulses $Pb_1$ and $Pb_2$ from the optical pulse Pa. FIG. 8 is a diagram illustrating an example of a band-controlled multi-pulse. In this example, the optical pulse train Pb including the optical pulses $Pb_1$ and $Pb_2$ is illustrated. FIG. 8(*a*) is a spectrogram, in which the horizontal axis indicates the time and the vertical axis indicates the wavelength, and light intensity is represented by color gradation. FIG. 8(*b*) illustrates the temporal waveform of the optical pulse train Pb. The temporal waveform of each of the optical pulses $Pb_1$ and $Pb_2$ has, for example, a Gaussian function shape. As illustrated in FIGS. 8(*a*) and 8(*b*), peaks of the optical pulses $Pb_1$ and $Pb_2$ are temporally separated from each other, and propagation timings of the optical pulses $Pb_1$ and $Pb_2$ are shifted from each other. In other words, with respect to one optical pulse $Pb_2$, another optical pulse $Pb_1$ has a time delay, and the optical pulses $Pb_1$ and $Pb_2$ have a time difference from each other. The center wavelengths of the optical pulses $Pb_1$ and $Pb_2$ are different from each other. The center wavelength of the optical pulse $Pb_1$ is, for example, 805 nm. The center wavelength of the optical pulse $Pb_2$ is, for example, 795 nm. The time interval (peak interval) between the optical pulses $Pb_1$ and $Pb_2$ is, for example, in a range of 10 fs to 10,000 fs, and is 2000 fs in an example. The FWHM of the optical pulses $Pb_1$ and $Pb_2$ is, for example, in a range of 10 fs to 5000 fs, and is 300 fs in an example.

FIG. 8(*c*) illustrates a spectrum obtained by combining two optical pulses $Pb_1$ and $Pb_2$. As illustrated in FIG. 8(*c*), the spectrum obtained by combining the two optical pulses $Pb_1$ and $Pb_2$ has a single peak. However, referring to FIG. 8(*a*), the center wavelengths of the two optical pulses $Pb_1$ and $Pb_2$ are shifted from each other. The single peak illustrated in FIG. 8(*c*) substantially corresponds to the spectrum of the optical pulse Pa. The peak wavelength interval between the adjacent optical pulses $Pb_1$ and $Pb_2$ is determined by the spectral bandwidth of the optical pulse Pa and is approximately in a range of twice the full width at half maximum. In an example, in a case where the full width at half maximum (FWHM), which is the spectral bandwidth of the optical pulse Pa, is 10 nm, the peak wavelength interval is 10 nm. As a specific example, in a case where the center wavelength of the optical pulse Pa is 1550 nm, the peak wavelengths of the optical pulses $Pb_1$ and $Pb_2$ can be 1555 nm and 1545 nm, respectively.

FIG. 9 is a diagram illustrating an example of a multi-pulse of which a band is not controlled, as a comparative example. In this example, an optical pulse train Pd including two optical pulses $Pd_1$ and $Pd_2$ is illustrated. Similarly to FIG. 8(*a*), FIG. 9(*a*) is a spectrogram, in which the horizontal axis indicates the time and the vertical axis indicates the wavelength, and the light intensity is represented by color gradation. FIG. 9(*b*) illustrates the temporal waveform of the optical pulse train Pd. FIG. 9(*c*) illustrates a spectrum obtained by combining the two optical pulses $Pd_1$ and $Pd_2$. As illustrated in FIGS. 9(*a*) to 9(*c*), the peaks of the two optical pulses $Pd_1$ and $Pd_2$ are temporally separated from each other, but the center wavelengths of the two optical pulses $Pd_1$ and $Pd_2$ coincide with each other. The pulse forming unit 3 in the present embodiment does not generate such an optical pulse train Pd, but generates an optical pulse train Pb having different center wavelengths as illustrated in FIG. 8.

Refer to FIG. 1 again. The dispersion medium 8 receives the optical pulse train Pb output from the pulse forming unit 3. The dispersion medium 8 has the positive or negative group delay dispersion. The sign of the group delay dispersion of the dispersion medium 8 is opposite to the sign of the group delay dispersion given to the optical pulse Pa in the pulse forming unit 3. That is, in a case where the positive group delay dispersion is given to the optical pulse Pa in the pulse forming unit 3, the dispersion medium 8 has the negative group delay dispersion. In a case where the negative group delay dispersion is given to the optical pulse Pa in the pulse forming unit 3, the dispersion medium 8 has the positive group delay dispersion. The dispersion medium 8 gives the group delay dispersion to the optical pulses $Pb_1$ and $Pb_2$ included in the optical pulse train Pb. As a result, the dispersion medium 8 increases the peak intensities of the optical pulses $Pb_1$ and $Pb_2$ contrary to the pulse forming unit 3, and makes the peak intensities of the optical pulses $Pb_1$ and $Pb_2$ equal to or greater than the detection threshold value of the correlator 4. The optical pulse train Pb transmitted through the dispersion medium 8 is output from the light output end 8*b*.

Refer to FIG. 7 again. As described above, the dispersion medium 8 gives, to the optical pulse train Pb, the group delay dispersion having a sign opposite to the group delay dispersion given to the optical pulse Pa in the pulse forming unit 3. Thus, the peak intensity of the optical pulse train Pb in the dispersion medium 8 is increased. As a result, it is possible to make the intensity of the optical pulse train Pb equal to or greater than a detection threshold value Q2 of the correlator 4.

The above operation will be described with reference to FIG. 6. For example, when the negative group delay dispersion is given to the optical pulse Pa in the pulse forming unit 3, the peak intensities of the optical pulses $Pb_1$ and $Pb_2$ are reduced as indicated by an arrow B1 in FIG. Then, when the positive group delay dispersion is given to the optical pulses $Pb_1$ and $Pb_2$ in the dispersion medium 8, the peak intensities of the optical pulses $Pb_1$ and $Pb_2$ increase as indicated by an arrow B2 in FIG. For example, when the positive group delay dispersion is given to the optical pulse Pa in the pulse forming unit 3, the peak intensities of the optical pulses $Pb_1$ and $Pb_2$ are reduced as indicated by an arrow B3 in FIG. Then, when the negative group delay dispersion is given to the optical pulses $Pb_1$ and $Pb_2$ in the dispersion medium 8, the peak intensities of the optical pulses $Pb_1$ and $Pb_2$ increase as indicated by an arrow B4 in FIG.

It is sufficient that the dispersion medium 8 is a medium in which the dispersion is not zero. The dispersion medium 8 may be, for example, a light guide member such as an optical fiber or an optical waveguide, or may be a semiconductor or a dielectric optical crystal. Examples of the optical fiber include a single mode fiber, a multi-mode fiber, a rare-earth-doped fiber, a photonic crystal fiber, a dispersion shifted fiber, and a double clad fiber. Examples of the optical waveguide include semiconductor micro-waveguides of SiN, InP, and the like. Examples of the semiconductor or the dielectric optical crystal include diamond, $SiO_2$, $LiNbO_3$, $LiTaO_3$, lanthanum-doped lead zirconate titanate (PLZT), Si, Ge, fullerene, graphite, graphene, carbon nanotube, GaN, GaAs, a magnetic body, an organic material, and a polymer material. The dispersion medium 8 may be, for example, a grating pair, a prism pair, or the like. The dispersion medium 8 may be, for example, glass such as BK7. In a case where the dispersion of the optical component 7 is large, the dispersion medium 8 may be, for example, SF11 or the like having large dispersion. The dispersion medium 8 is preferably a dispersion medium in which the non-linear optical phenomenon does not occur, and it is sufficient that the dispersion medium is a dispersion medium in which the non-linear optical phenomenon hardly occurs. It is sufficient that the dispersion medium 8 has a sufficiently small non-linear optical effect, for example.

Refer to FIG. 1 again. The correlation optical system 40 receives the optical pulse train Pb output from the dispersion medium 8 via the dispersion medium 8 and outputs the correlated light Pc. The correlated light Pc includes a plurality of optical pulses (plurality of third optical pulses) that are cross-correlation or autocorrelation of the optical pulse train Pb. In the present embodiment, the correlation optical system 40 includes a lens 41, an optical element 42, and a lens 43. The lens 41 is provided on an optical path between the pulse forming unit 3 and the optical element 42, and focuses the optical pulse train Pb output from the pulse forming unit 3 on the optical element 42. The optical element 42 is, for example, a light-emitting object including one or both of a phosphor and a non-linear optical crystal that generates a second harmonic wave (SHG). Examples of the non-linear optical crystal include a KTP ($KTiOPO_4$) crystal, an LBO ($LiB_3O_5$) crystal, a BBO ($\beta$-$BaB_2O_4$) crystal, and the like. Examples of the phosphor include coumarin, stilbene, rhodamine, and the like. The optical element 42 generates correlated light Pc including cross-correlation or autocorrelation of the optical pulse train Pb by receiving an input of the optical pulse train Pb. The lens 43 collimates or focuses the correlated light Pc output from the optical element 42. The correlated light Pc is light generated to more accurately calculate the feature amount of the temporal waveform of the optical pulse train Pb.

Here, a configuration example of the correlation optical system 40 will be described in detail. FIG. 10 is a schematic diagram illustrating a correlation optical system 40A for generating correlated light Pc including autocorrelation of the optical pulse train Pb, as the configuration example of the correlation optical system 40. The correlation optical system 40A includes a beam splitter 44 as an optical branching component that branches the optical pulse train Pb into two pieces. The beam splitter 44 is optically coupled to the pulse forming unit 3 via the dispersion medium 8 illustrated in FIG. 1. The beam splitter 44 transmits a part of the optical pulse train Pb input from the pulse forming unit 3 via the dispersion medium 8, and reflects the remaining part. The branching ratio of the beam splitter 44 is, for example, 1:1. One optical pulse train Pba branched by the beam splitter 44 reaches the lens 41 through an optical path 40*c* including a plurality of mirrors 45. The other optical pulse train Pbb branched by the beam splitter 44 reaches the lens 41 through an optical path 40*d* including a plurality of mirrors 46. The optical length of the optical path 40*c* is different from the optical length of the optical path 40*d*. Therefore, the plurality of mirrors 45 and the plurality of mirrors 46 constitute a delay optical system that applies a time difference to one optical pulse train Pba and the other optical pulse train Pbb branched by the beam splitter 44. Further, at least some of the plurality of mirrors 46 are mounted on a moving stage 47, and thus the optical length of the optical path 40*d* becomes variable. Therefore, in this configuration, it is possible to make the time difference between the optical pulse train Pba and the optical pulse train Pbb variable.

In this example, the optical element 42 includes a non-linear optical crystal. The lens 41 focuses each of the optical pulse trains Pba and Pbb toward the optical element 42, and causes the optical axes of the optical pulse trains Pba and Pbb to intersect each other at a predetermined angle in the optical element 42. As a result, in the optical element 42 which is a non-linear optical crystal, a second harmonic wave is generated starting from the intersection of the optical pulse trains Pba and Pbb. The second harmonic wave is the correlated light Pc and includes autocorrelation of the optical pulse train Pb. The correlated light Pc is collimated or focused by the lens 43 and then input to the detector 400.

FIG. 11 is a schematic diagram illustrating a correlation optical system 40B for generating correlated light Pc including cross-correlation of the optical pulse train Pb, as another configuration example of the correlation optical system 40. In the correlation optical system 40B, the optical pulse train Pb reaches the lens 41 through an optical path 40*e*, and a reference optical pulse Pr, which is a single pulse, reaches the lens 41 through an optical path 40f. The optical path 40f includes a plurality of mirrors 48 and is bent in a U shape. Further, at least some of the plurality of mirrors 48 are mounted on a moving stage 49, and thus the optical length of the optical path 40f becomes variable. Therefore, in this configuration, it is possible to make the time difference between the optical pulse train Pb and the reference optical pulse Pr (timing difference to reach the lens 41) variable.

Also in this example, the optical element 42 includes a non-linear optical crystal. The lens 41 focuses the optical pulse train Pb and the reference optical pulse Pr toward the optical element 42, and causes the optical axis of the optical pulse train Pb to intersect the optical axis of the reference optical pulse Pr at a predetermined angle in the optical element 42. As a result, in the optical element 42 which is a non-linear optical crystal, a second harmonic wave is generated starting from the intersection of the optical pulse train Pb and the reference optical pulse Pr. The second harmonic wave is the correlated light Pc and includes cross-correlation of the optical pulse train Pb. The correlated light Pc is collimated or focused by the lens 43 and then input to the detector 400.

FIG. 12 is a schematic diagram illustrating a correlation optical system 40C for generating correlated light Pc including cross-correlation of the optical pulse train Pb, as still another configuration example of the correlation optical system 40. In this example, the SLM 14 of the pulse forming unit 3 is a polarization-dependent spatial light modulator having a modulation effect in a first polarization direction. Regarding this, the deflection plane of the optical pulse Pa input to the pulse forming unit 3 is inclined with respect to the polarization direction in which the SLM 14 has a modulation function. The optical pulse Pa includes a polarization component (arrow $Dp_1$ in FIG.) in the first polarization direction and a polarization component (symbol $Dp_2$ in FIG.) in a second polarization direction perpendicular to the first polarization direction. The polarization of the optical pulse Pa is not limited to the above-described polarization (inclined linear polarization), and may be elliptically polarized light.

The polarization component of the optical pulse Pa in the first polarization direction is modulated in the SLM 14 and output from the pulse forming unit 3 as the optical pulse train Pb. The polarization component of the optical pulse Pa in the second polarization direction is output from the pulse forming unit 3 as it is without being modulated in the SLM 14. The unmodulated polarization component is provided to the correlation optical system 40 coaxially with the optical pulse train Pb as the reference optical pulse Pr that is a single pulse. The correlation optical system 40 generates correlated light Pc including cross-correlation of the optical pulse train Pb from the optical pulse train Pb and the reference optical pulse Pr. In this configuration example, since a delay is applied to the optical pulse train Pb in the SLM 14 and a delay time is made variable (arrow E in FIG.), it is possible to make the time difference between the optical pulse train Pb and the reference optical pulse Pr (timing difference to reach the lens 41) variable. Therefore, it is possible to suitably generate the correlated light Pc including the cross-correlation of the optical pulse train Pb in the correlation optical system 40.

FIG. 13(a) illustrates the temporal waveform of the correlated light Pc in a case where the wavelength dispersion amount of the optical component 7 is zero. FIG. 13(b) illustrates the temporal waveform of the correlated light Pc in a case where the wavelength dispersion amount of the optical component 7 is not zero. In this example, peak intensities $PE_1$ to $PE_3$ of optical pulses $Pc_1$ to $Pc_3$ included in the correlated light Pc in FIG. 13(b) are greatly reduced as compared with those of FIG. 13(a). In addition, the full widths at half maximum $W_1$ to $W_3$ of the optical pulses $Pc_1$ to $Pc_3$ included in the correlated light Pc in FIG. 13(b) are significantly enlarged as compared with those of FIG. 13(a). Furthermore, a peak time interval $G_{1,2}$ of the correlated light Pc in FIG. 13(b) is largely longer than that in FIG. 13(a).

As described above, in a case where the wavelength dispersion of the optical component 7 is not zero, the peak intensities $PE_1$ to $PE_3$, the full widths at half maximum $W_1$ to $W_3$, and the peak time intervals $G_{1,2}$, and $G_{2,3}$, which are the feature amounts of the temporal waveform of the correlated light Pc, greatly change as compared with a case where the wavelength dispersion amount of the optical component 7 is zero. The amount of change depends on the wavelength dispersion amount of the optical component 7. Thus, by observing the change in the feature amount of the temporal waveform of the correlated light Pc, it is possible to accurately and easily known the wavelength dispersion amount of the optical component 7. However, in the above observation, the wavelength dispersion amount of the optical component 7 may be corrected by using a known wavelength dispersion amount of the pulsed laser light source 2.

Refer to FIG. 1 again. The detector 400 receives the correlated light Pc output from the correlation optical system 40. The detector 400 detects the temporal waveform of the correlated light Pc formed from the optical pulse train Pb having a peak intensity equal to or greater than the detection threshold value of the correlator 4. The detector 400 is configured to include, for example, a photodetector such as a photodiode. The detector 400 detects the temporal waveform of the correlated light Pc by converting the intensity of the correlated light Pc into an electrical signal. The electric signal that is the detection result is provided to the arithmetic operation unit 5b. In the present embodiment, the detection threshold value of the correlator 4 is a value determined based on the characteristics of the correlation optical system 40 and the detector 400. Since the optical pulse train Pb having a peak intensity equal to or greater than the detection threshold value of the correlator 4 enters into the correlation optical system 40, it is possible for the detector 400 to accurately detect the temporal waveform of the optical pulse train Pb.

The arithmetic operation unit 5b is electrically connected to the detector 400. The arithmetic operation unit 5b estimates the wavelength dispersion amount of the optical component 7 based on the feature amount of the temporal waveform provided from the detector 400. As described above, according to the knowledge of the present inventor, in a case where the correlated light Pc including the cross-correlation or the autocorrelation of the optical pulse train Pb is generated, various feature amounts (for example, pulse interval, peak intensity, pulse width, and the like) in the temporal waveform of the correlated light Pc have a significant correlation with the wavelength dispersion amount of the measurement object. Therefore, the arithmetic operation unit 5b can accurately estimate the wavelength dispersion amount of the optical component 7 as the measurement object by evaluating the feature amount of the temporal waveform of the correlated light Pc.

The output unit 5c outputs the estimation result of the wavelength dispersion amount obtained by the arithmetic operation unit 5b. The output unit 5c is, for example, a display device that displays the estimation result of the wavelength dispersion amount.

The optical component 7 is disposed on the optical path between the pulse forming unit 3 and the dispersion medium 8. The optical component 7 is, for example, a light guide member such as an optical fiber or an optical waveguide. Examples of the optical fiber include a single mode fiber, a multi-mode fiber, a rare-earth-doped fiber, a photonic crystal fiber, a dispersion shifted fiber, and a double clad fiber. Examples of the optical waveguide include semiconductor micro-waveguides of SiN, InP, and the like. The optical component 7 may be, for example, a semiconductor or a dielectric optical crystal. In this case, the optical component 7 may be diamond, $SiO_2$, $LiNbO_3$, $LiTaO_3$, PLZT, Si, Ge, fullerene, graphite, graphene, carbon nanotube, GaN, GaAs, a magnetic body, an organic material, a polymer material, or the like.

Here, a combination of the sign of the group delay dispersion given by the phase pattern presented to the SLM 14, the sign of the group delay dispersion of the optical component 7, and the sign of the group delay dispersion of the dispersion medium 8 will be described. In the present embodiment, it is sufficient that the peak intensities of the optical pulses $Pb_1$ and $Pb_2$ are reduced by the group delay dispersion given to the optical pulse Pa by the phase pattern presented in the SLM 14, and the peak intensities of the optical pulses $Pb_1$ and $Pb_2$ are increased by the group delay dispersion of the dispersion medium 8. Therefore, it is sufficient that the sign of the group delay dispersion given by the phase pattern presented to the SLM 14 is opposite to the sign of the group delay dispersion of the dispersion medium 8. The sign of the group delay dispersion of the optical component 7 may be either positive or negative. It is more preferable that the group delay dispersion given by the phase pattern presented to the SLM 14 be a negative group delay dispersion, and the group delay dispersion given by the dispersion medium 8 be a positive group delay dispersion. The group delay dispersion provided by many types of dispersion media is a positive group delay dispersion. Therefore, in a case where the group delay dispersion given from the dispersion medium 8 is the positive group delay dispersion, it is possible to select more types of dispersion media as the dispersion medium 8 in the present embodiment, as compared with a case where the group delay dispersion given from the dispersion medium 8 is the negative group delay dispersion.

FIG. 14 is a schematic diagram illustrating a configuration example of hardware of the control device 5. As illustrated in FIG. 14, the control device 5 may be physically configured as a normal computer including a processor (CPU) 51, a main storage device such as a ROM 52 and a RAM 53, an input device 54 such as a keyboard, a mouse, and a touch screen, an output device 55 such as a display (including a touch screen), a communication module 56 (such as a network card) for transmitting and receiving data to and from other devices, an auxiliary storage device 57 such as a hard disk, and the like.

The processor 51 of the computer can realize the function of the arithmetic operation unit 5b by a wavelength dispersion amount calculation program. In other words, the wavelength dispersion amount calculation program causes the processor 51 of the computer to operate as the arithmetic operation unit 5b. The wavelength dispersion amount calculation program is stored in a storage device (storage medium) inside or outside the computer, for example, the auxiliary storage device 57. The storage device may be a non-transitory recording medium. Examples of the recording medium include a recording medium such as a flexible disk, a CD, and a DVD, a recording medium such as a ROM, a semiconductor memory, and a cloud server. The output device 55 such as a display (including a touch screen) operates as the output unit 5c.

The auxiliary storage device 57 stores the feature amount of the temporal waveform of the correlated light Pc theoretically calculated in advance (or measured in advance) on the assumption that the wavelength dispersion amount of the optical component 7 is zero. By comparing the stored feature amount with the feature amount of the temporal waveform of the correlated light Pc detected by the detector 400, it can be seen how much the feature amount of the correlated light Pc has changed due to the wavelength dispersion amount of the optical component 7. Therefore, the arithmetic operation unit 5b can estimate the wavelength dispersion amount of the optical component 7 by comparing the feature amount stored in the auxiliary storage device 57 with the feature amount of the temporal waveform of the correlated light Pc detected by the detector 400.

FIG. 15 is a flowchart illustrating a dispersion measuring method using the dispersion measuring device 1A having the above configuration. First, in an output step S101, the pulsed laser light source 2 outputs an optical pulse Pa.

Then, in a pulse forming step S102, the pulse forming unit 3 receives the optical pulse Pa and generates an optical pulse train Pb. Specifically, the pulse forming unit 3 forms the optical pulse train Pb from the optical pulse Pa output from the pulsed laser light source 2. The optical pulse train Pb is modulated light including a plurality of optical pulses $Pb_1$ and $Pb_2$ having a time difference from each other and having different center wavelengths from each other. For example, the pulse forming unit 3 spatially separates a plurality of wavelength components included in the optical pulse Pa for each wavelength, and shifts the phases of the plurality of wavelength components from each other by using the SLM 14. Then, the pulse forming unit 3 focuses the plurality of wavelength components. Thus, it is possible to easily generate the optical pulse train Pb. In addition, in the pulse forming step S102, a phase pattern presented to the SLM 14 gives a positive or negative group delay dispersion to the optical pulse Pa. As a result, as described in the description of the pulse forming unit 3, in the optical pulses $Pb_1$ and $Pb_2$ to be formed, it is possible to reduce the peak intensity in the time domain while maintaining the intensity in the spectrum domain.

Subsequently, in a dispersion medium transmission step S103, the optical pulse train Pb is transmitted through the dispersion medium 8. Specifically, after the optical pulse train Pb output from the pulse forming unit 3 is transmitted through the optical component 7, the optical pulse train Pb is transmitted through the dispersion medium 8. The dispersion medium 8 has a group delay dispersion having a sign opposite to the group delay dispersion given to the optical pulse Pa. When the optical pulse train Pb is transmitted, the dispersion medium 8 gives a group delay dispersion to the optical pulses $Pb_1$ and $Pb_2$ included in the optical pulse train Pb. As a result, when the optical pulse train Pb is transmitted through the dispersion medium 8, the dispersion medium 8 increases the peak intensities of the optical pulses $Pb_1$ and $Pb_2$ in the time domain. Therefore, it is possible to make the peak intensities of the optical pulses $Pb_1$ and $Pb_2$ be equal to or greater than the detection threshold value of the correlator 4.

Subsequently, in a detection step S104, the temporal waveform of the correlated light Pc is detected. Specifically, the correlation optical system 40 receives the optical pulse train Pb output from the dispersion medium 8, and outputs correlated light Pc including a plurality of optical pulses $Pc_1$ to $Pc_3$ that are cross-correlation or autocorrelation of the optical pulse train Pb. Then, the detector 400 detects the temporal waveform of the correlated light Pc. As an example, after the optical pulse train Pb is transmitted through the dispersion medium 8, the correlation optical system 40 uses the optical element 42 including one or both of the non-linear optical crystal and the phosphor to generate the correlated light Pc including cross-correlation or auto-correlation of the optical pulse train Pb.

For example, as illustrated in FIG. 10, the optical pulse train Pb is branched into two pieces, and one branched optical pulse train Pbb is swept with respect to the other optical pulse train Pba in time. Then, correlated light Pc including autocorrelation of the optical pulse train Pb is generated from one optical pulse train Pbb and the other optical pulse train Pba. Alternatively, for example, as illustrated in FIG. 11, the reference optical pulse Pr is swept with respect to the optical pulse train Pb in time. Then, correlated light Pc including cross-correlation of the optical pulse train Pb is generated from the reference optical pulse Pr and the optical pulse train Pb. Alternatively, for example, as illustrated in FIG. 12, the optical pulse train Pb is generated by modulating only the polarization component of the optical pulse Pa in the first polarization direction in the SLM 14. The polarization component of the optical pulse Pa in the second polarization direction is used as the reference optical pulse Pr. Then, in the SLM 14, the optical pulse train Pb is swept with respect to the reference optical pulse Pr in time. Then, correlated light Pc including cross-correlation of the optical pulse train Pb is generated from the optical pulse train Pb and the reference optical pulse Pr.

Subsequently, in an arithmetic operation step S105, the arithmetic operation unit 5b estimates the wavelength dispersion amount of the optical component 7 based on the feature amount of the temporal waveform of the correlated light Pc. Specifically, first, the arithmetic operation unit 5b acquires the feature amount of the temporal waveform of the correlated light Pc theoretically calculated in advance (or measured in advance) on the assumption that the wavelength dispersion of the optical component 7 is zero. Then, the arithmetic operation unit 5b acquires the feature amount of the temporal waveform of the correlated light Pc detected in the detection step S104. Here, the feature amount is, for example, at least one feature amount selected from the group consisting of peak intensities $E_1$ to $E_3$, the full widths at half maximum $W_1$ to $W_3$, and the peak time intervals $G_{1,2}$, and $G_{2,3}$ illustrated in FIG. 13. Subsequently, the arithmetic operation unit 5b estimates the wavelength dispersion amount of the optical component 7 by comparing the acquired feature amounts of the two temporal waveforms.

Here, phase modulation for generating a band-controlled multi-pulse in the SLM 14 of the pulse forming unit 3 illustrated in FIG. 2 will be described in detail. A domain before the lens 15 (spectral domain) and a domain behind the diffraction grating 16 (time domain) are in a Fourier transform relationship with each other. The phase modulation in the spectral domain has an influence on a temporal intensity waveform in the time domain. Therefore, the output light from the pulse forming unit 3 can have various temporal intensity waveforms different from the optical pulse Pa, in accordance with a modulation pattern of the SLM 14. FIG. 16(*a*) illustrates a spectral waveform (spectrum phase G21 and spectrum intensity G22) of the single-pulsed optical pulse Pa as an example. FIG. 16(*b*) illustrates a temporal intensity waveform of the optical pulse Pa. FIG. 17(*a*)

illustrates a spectral waveform (spectrum phase G33 and spectrum intensity G32) of the output light from the pulse forming unit 3 when rectangular wave-shaped phase spectrum modulation is applied in the SLM 14, as an example. FIG. 17(*b*) illustrates a temporal intensity waveform of the output light. In FIGS. 16(*a*) and 17(*a*), the horizontal axis indicates the wavelength (nm), the left vertical axis indicates the intensity value (arbitrary unit) of an intensity spectrum, and the right vertical axis indicates the phase value (rad) of a phase spectrum. In FIGS. 16(*b*) and 17(*b*), the horizontal axis indicates the time (femtosecond), and the vertical axis indicates the light intensity (arbitrary unit). In the example illustrated in FIG. 17, the single pulse of the optical pulse Pa is converted into a double pulse with high-order light by giving a rectangular wave-shaped phase spectral waveform to the output light. The spectrum and the waveform illustrated in FIG. 17 are one example. By combining various phase spectra and intensity spectra, it is possible to shape the temporal intensity waveform of the output light from the pulse forming unit 3 into various shapes.

FIG. 18 is a diagram illustrating a configuration of a modulation pattern calculation apparatus 20 that performs an arithmetic operation of the SLM 14. The modulation pattern calculation apparatus 20 is, for example, a personal computer; a smart device such as a smartphone and a tablet terminal; or a computer such as a cloud server, that includes a processor. The arithmetic operation unit 5b illustrated in FIG. 1 may also serve as the modulation pattern calculation apparatus 20. The modulation pattern calculation apparatus 20 is electrically connected to the SLM 14. The modulation pattern calculation apparatus 20 calculates a phase modulation pattern for bringing the temporal intensity waveform of the output light of the pulse forming unit 3 close to a desired waveform, and provides a control signal including the calculated phase modulation pattern to the SLM 14. The modulation pattern is data for controlling the SLM 14, and is data including a table of intensity of complex amplitude distribution or intensity of phase distribution. The modulation pattern is, for example, a computer-generated hologram (CGH).

The modulation pattern calculation apparatus 20 in the present embodiment causes the control unit 5a to store a phase pattern including a phase pattern for phase modulation and a phase pattern for intensity modulation. The phase pattern for phase modulation is a phase pattern that applies a phase spectrum for obtaining a desired waveform to the output light. The phase pattern for intensity modulation is a phase pattern that applies an intensity spectrum for obtaining a desired waveform to the output light. Therefore, as illustrated in FIG. 18, the modulation pattern calculation apparatus 20 includes an arbitrary waveform input unit 21, a phase spectrum design unit 22, an intensity spectrum design unit 23, and a modulation pattern generation unit 24. That is, the processor of a computer provided in the modulation pattern calculation apparatus 20 realizes the function of the arbitrary waveform input unit 21, the function of the phase spectrum design unit 22, the function of the intensity spectrum design unit 23, and the function of the modulation pattern generation unit 24. The respective functions may be realized by the same processor or may be realized by different processors.

The processor of the computer can implement the above functions by a modulation pattern calculation program. Thus, the modulation pattern calculation program causes the processor of the computer to operate as the arbitrary waveform input unit 21, the phase spectrum design unit 22, the intensity spectrum design unit 23, and the modulation pattern generation unit 24 in the modulation pattern calculation apparatus 20. The modulation pattern calculation program is stored in a storage device (storage medium) inside or outside the computer. The storage device may be a non-transitory recording medium. Examples of the recording medium include a recording medium such as a flexible disk, a CD, and a DVD, a recording medium such as a ROM, a semiconductor memory, a cloud server, and the like.

The arbitrary waveform input unit 21 receives the desired temporal intensity waveform input from an operator. The operator inputs information on the desired temporal intensity waveform (for example, a pulse interval, a pulse width, the number of pulses, and the like) to the arbitrary waveform input unit 21. The information on the desired temporal intensity waveform is provided to the phase spectrum design unit 22 and the intensity spectrum design unit 23. The phase spectrum design unit 22 calculates a phase spectrum of the output light of the pulse forming unit 3, which is suitable for realizing the given desired temporal intensity waveform. The intensity spectrum design unit 23 calculates an intensity spectrum of the output light of the pulse forming unit 3, which is suitable for realizing the given desired temporal intensity waveform. The modulation pattern generation unit 24 calculates a phase modulation pattern (for example, a computer-generated hologram) for applying the phase spectrum obtained in the phase spectrum design unit 22 and the intensity spectrum obtained in the intensity spectrum design unit 23 to the output light of the pulse forming unit 3. Then, a control signal SC including the calculated phase modulation pattern is provided to the SLM 14. The SLM 14 is controlled based on the control signal SC.

FIG. 19 is a block diagram illustrating an internal configuration of the phase spectrum design unit 22 and the intensity spectrum design unit 23. As illustrated in FIG. 19, the phase spectrum design unit 22 and the intensity spectrum design unit 23 include a Fourier transform unit 25, a function replacement unit 26, a waveform function modification unit 27, an inverse Fourier transform unit 28, and a target generation unit 29. The target generation unit 29 includes a Fourier transform unit 29a and a spectrogram modification unit 29b. The functions of each of the components will be described in detail later.

The desired temporal intensity waveform is expressed as a function in the time domain and the phase spectrum is expressed as a function in the frequency domain. Therefore, the phase spectrum corresponding to the desired temporal intensity waveform is obtained, for example, by an iterative Fourier transform based on the desired temporal intensity waveform. FIG. 20 is a diagram illustrating a calculation procedure of the phase spectrum using the iterative Fourier transform method. First, an initial intensity spectrum function $A_0(\omega)$ and an initial phase spectrum function $\Psi_0(\omega)$, which are functions of the frequency $\omega$, are prepared (process number (1) in FIG.). In an example, the intensity spectrum function $A_0(\omega)$ and the phase spectrum function $\Psi_0(\omega)$ represent the spectrum intensity and the spectrum phase of the input light, respectively. Then, a waveform function (a) in the frequency domain, which includes the intensity spectrum function $A_0(\omega)$ and the phase spectrum function $\Psi_n(\omega)$, is prepared (process number (2) in FIG.).

[Formula. 1]

$$\sqrt{A_0(\omega)}\,\exp\{i\Psi_n(\omega)\} \tag{a}$$

The subscript n indicates after the n-th Fourier transform process. Before a first Fourier transform process, the initial phase spectrum function $\Psi_0(\omega)$ described above is used as the phase spectrum function $\Psi_n(\omega)$. i is an imaginary number.

Then, Fourier transform from the frequency domain to the time domain is performed on the function (a) (arrow A1 in FIG.). As a result, a waveform function (b) in the time domain, which includes a temporal intensity waveform function $b_n(t)$ and a time-phase waveform function $\Theta_n(t)$, is obtained (process number (3) in FIG.).

[Formula. 2]

$$\sqrt{b_n(t)}\,\exp\{i\Theta_n(t)\} \tag{b}$$

Subsequently, the temporal intensity waveform function $b_n(t)$ included in the function (b) is replaced with a temporal intensity waveform function $\mathrm{Target}_0(t)$ based on a desired waveform (process numbers (4) and (5) in FIG.).

[Formula. 3]

$$b_n(t) := \mathrm{Target}_0(t) \tag{c}$$

[Formula. 4]

$$\sqrt{\mathrm{Target}_0(t)}\,\exp\{i\Theta_n(t)\} \tag{d}$$

Subsequently, inverse Fourier transform from the time domain to the frequency domain is performed on a function (d) (arrow A2 in FIG.). As a result, a waveform function (e) in the frequency domain, which includes an intensity spectrum function $B_n(\omega)$ and the phase spectrum function $\Psi_n(\omega)$, is obtained (process number (6) in FIG.).

[Formula. 5]

$$\sqrt{B_n(\omega)}\,\exp\{i\Psi_n(\omega)\} \tag{e}$$

Subsequently, in order to restrain the intensity spectrum function $B_n(\omega)$ included in the function (e), the intensity spectrum function $B_n(\omega)$ is replaced with the initial intensity spectrum function $A_0(\omega)$ (process number (7) in FIG.).

[Formula. 6]

$$B_n(\omega) := A_0(\omega) \tag{f}$$

Thereafter, by repeatedly performing the above processes (2) to (7) a plurality of times, the phase spectrum shape represented by the phase spectrum function $\Psi_n(\omega)$ in the waveform function can be brought close to the phase spectrum shape corresponding to the desired temporal intensity waveform. The finally obtained phase spectrum function $\Psi_{IFTA}(\omega)$ is the basis of the modulation pattern for obtaining the desired temporal intensity waveform.

However, the iterative Fourier method as described above has a problem that, although the temporal intensity waveform can be controlled, it is not possible to control the frequency component (band wavelength) constituting the temporal intensity waveform. Therefore, the modulation pattern calculation apparatus 20 in the present embodiment calculates the phase spectrum function and the intensity spectrum function that are the basis of the modulation pattern, by using a calculation method described below. FIG. 21 is a diagram illustrating a calculation procedure of the phase spectrum function in the phase spectrum design unit 22. First, an initial intensity spectrum function $A_0(\omega)$ and an initial phase spectrum function $\Phi_0(\omega)$, which are functions of the frequency $\omega$, are prepared (process number (11) in FIG.). In an example, the intensity spectrum function $A_0(\omega)$ and the phase spectrum function $\Phi_0(\omega)$ represent the spectrum intensity and the spectrum phase of input light, respectively. Then, a first waveform function (g) in the frequency domain, which includes the intensity spectrum function $A_0(\omega)$ and the phase spectrum function $\Phi_0(\omega)$, is prepared (process number (12-$a$)). Where i is an imaginary number.

[Formula. 7]

$$\sqrt{A_0(\omega)}\exp\{i\Phi_0(\omega)\} \tag{g}$$

Subsequently, the Fourier transform unit 25 of the phase spectrum design unit 22 performs the Fourier transform on the function (g) from the frequency domain to the time domain (arrow A3 in FIG.). As a result, a second waveform function (h) in the time domain, which includes the temporal intensity waveform function $a_0(t)$ and the time-phase waveform function $\varphi_0(t)$, is obtained (Fourier transform step, process number (13)).

[Formula. 8]

$$\sqrt{a_0(t)}\exp\{i\varphi_0(t)\} \tag{h}$$

Subsequently, the function replacement unit 26 of the phase spectrum design unit 22 substitutes the temporal intensity waveform function $\text{Target}_0(t)$ based on the desired waveform input by the arbitrary waveform input unit 21 into a temporal intensity waveform function $b_0(t)$ as illustrated in the following formula (i) (process number (14-$a$)).

[Formula. 9]

$$b_0(t) = \text{Target}_0(t) \tag{i}$$

Subsequently, the function replacement unit 26 of the phase spectrum design unit 22 substitutes the temporal intensity waveform function $a_0(t)$ with the temporal intensity waveform function $b_0(t)$, as represented by the following formula (j). That is, the temporal intensity waveform function $a_0(t)$ included in the function (h) is replaced with the temporal intensity waveform function $\text{Target}_0(t)$ based on the desired waveform (function replacement step, process number (15)).

[Formula. 10]

$$\sqrt{b_0(t)}\exp\{i\varphi_0(t)\} \tag{j}$$

Subsequently, the waveform function modification unit 27 of the phase spectrum design unit 22 corrects the second waveform function such that the spectrogram of the second waveform function (j) after the replacement is close to the target spectrogram generated in advance in accordance with a desired wavelength band. First, by performing time-frequency transform on the second waveform function (j) after the replacement, the second waveform function (j) is converted into a spectrogram $SG_{0,k}(\omega, t)$ (process number (15-$a$) in FIG.). The subscript k indicates k-th conversion processing.

Here, the time-frequency transform refers to performing frequency filter processing or numerical arithmetic operation processing (processing of obtaining a spectrum for each time by performing multiplication while shifting a window function) on a composite signal such as a temporal waveform to convert the composite signal into three-dimensional information including time, frequency, and intensity (spectrum intensity) of a signal component. Further, in the present embodiment, the transform result (time, frequency, and spectrum intensity) is defined as a "spectrogram".

Examples of the time-frequency transform include short-time Fourier transform (STFT), wavelet transform (Halle wavelet transform, Gabor wavelet transform, Mexican-hat wavelet transform, Morley wavelet transform), and the like.

In addition, the target spectrogram $\text{TargetSG}_0(\omega, t)$ generated in advance in accordance with the desired wavelength band is read from the target generation unit 29. The target spectrogram $\text{TargetSG}_0(\omega, t)$ has substantially the same value as the target temporal waveform (the temporal intensity waveform and the frequency component constituting the temporal intensity waveform), and is generated in the target spectrogram function of the process number (15-$b$).

Then, the waveform function modification unit 27 of the phase spectrum design unit 22 performs pattern matching between the spectrogram $SG_{0,k}(\omega, t)$ and the target spectrogram $\text{TargetSG}_0(\omega, t)$, and examines the similarity (how much the spectrogram $SG_{0,k}(\omega, t)$ and the target spectrogram $\text{TargetSG}_0(\omega, t)$ match with each other). In the present embodiment, an evaluation value is calculated as an index representing the similarity. Then, in the subsequent process number (15-$c$), it is determined whether or not the obtained evaluation value satisfies a predetermined end condition. When the condition is satisfied, the process proceeds to a process number (16). When the condition is not satisfied, the process proceeds to a process number (15-$d$). In the process number (15-$d$), the time-phase waveform function $\varphi_0(t)$ included in the second waveform function is changed to a certain time-phase waveform function $\varphi_{0,k}(t)$. The second waveform function after changing the time-phase waveform function is converted into a spectrogram again by time-frequency transform such as STFT. Thereafter, the above-described process numbers (15-$a$) to (15-$d$) are repeatedly performed. In this manner, the second waveform function is corrected such that the spectrogram $SG_{0,k}(\omega, t)$ is gradually brought close to the target spectrogram $\text{TargetSG}_0(\omega, t)$ (waveform function correction step).

Then, the inverse Fourier transform unit 28 of the phase spectrum design unit 22 performs an inverse Fourier transform on the corrected second waveform function (arrow A4 in FIG.) and generates a third waveform function (k) in the frequency domain (inverse Fourier transform step, process number (16)).

[Formula. 11]

$$\sqrt{B_{0,k}(\omega)}\,\exp\{i\Phi_{0,k}(\omega)\} \qquad \text{(k)}$$

The phase spectrum function $\Phi_{0,k}(\omega)$ included in the third waveform function (k) becomes a desired phase spectrum function $\Phi_{TWC\text{-}TFD}(\omega)$ to be finally obtained. The phase spectrum function $\Psi_{TWC\text{-}TFD}(\omega)$ is provided to the modulation pattern generation unit 24.

FIG. 22 is a diagram illustrating a calculation procedure of the intensity spectrum function in the intensity spectrum design unit 23. Since the process numbers (11) to (15-c) are similar to the above-described spectrum phase calculation procedure in the phase spectrum design unit 22, the description thereof is omitted. In a case where the evaluation value indicating the similarity between the spectrogram $SG_{0,k}(\omega, t)$ and the target spectrogram $TargetSG_0(\omega, t)$ does not satisfy the predetermined end condition, the waveform function modification unit 27 of the intensity spectrum design unit 23 changes the temporal intensity waveform function $b_0(t)$ to a certain temporal intensity waveform function $b_{0,k}(t)$ while restraining the time-phase waveform function $\varphi_0(t)$ included in the second waveform function with the initial value (process number (15-e)). The second waveform function after changing the temporal intensity waveform function is converted into a spectrogram again by time-frequency transform such as STFT. Thereafter, the process numbers (15-a) to (15-c) are repeatedly performed. In this manner, the second waveform function is corrected such that the spectrogram $SG_{0,k}(\omega, t)$ is gradually brought close to the target spectrogram $TargetSG_0(\omega, t)$ (waveform function correction step).

Then, the inverse Fourier transform unit 28 of the intensity spectrum design unit 23 performs an inverse Fourier transform on the corrected second waveform function (arrow A4 in FIG.) and generates a third waveform function (m) in the frequency domain (inverse Fourier transform step, process number (16)).

[Formula. 12]

$$\sqrt{B_{0,k}(\omega)}\,\exp\{i\Phi_{0,k}(\omega)\} \qquad \text{(m)}$$

Subsequently, in the process number (17-b), a filter processing unit of the intensity spectrum design unit 23 performs filter processing based on the intensity spectrum of the input light, on the intensity spectrum function $B_{0,k}(\omega)$ included in the third waveform function (m) (filter processing step). Specifically, in the intensity spectrum obtained by multiplying the intensity spectrum function $B_{0,k}(\omega)$ by a coefficient $\alpha$, a portion exceeding the cutoff intensity for each wavelength determined based on the intensity spectrum of the input light is cut. This is performed in order to prevent an occurrence of a situation in which an intensity spectrum function $\alpha B_{0,k}(\omega)$ does not exceed the spectrum intensity of the input light in all the wavelength ranges. In an example, the cutoff intensity for each wavelength is set to coincide with the intensity spectrum of the input light (the initial intensity spectrum function $A_0(\omega)$ in the present embodiment). In this case, as represented in the following formula (n), at frequencies where the intensity spectrum function $\alpha B_{0,k}(\omega)$ is larger than the intensity spectrum function $A_0(\omega)$, the value of the intensity spectrum function $A_0(\omega)$ is taken as the value of the intensity spectrum function $A_{TWC\text{-}TFD}(\omega)$. At frequencies where the intensity spectrum function $\alpha B_{0,k}(\omega)$ is equal to or smaller than the intensity spectrum function $A_0(\omega)$, the value of the intensity spectrum function $(B_{0,k}(\omega))$ is taken as the value of the intensity spectrum function $A_{TWC\text{-}TFD}(\omega)$ (process number (17-b) in FIG.).

[Formula. 13]

$$A_{TWC\text{-}TFD}(\omega) = \begin{cases} A_0(\omega) & A_0(\omega) < \alpha B_{0,k}(\omega) \\ \alpha B_{0,k}(\omega) & A_0(\omega) \geq \alpha B_{0,k}(\omega) \end{cases} \qquad \text{(n)}$$

The intensity spectrum function $A_{TWC\text{-}TFD}(\omega)$ is provided to the modulation pattern generation unit 24 as the desired spectrum intensity to be finally obtained.

The modulation pattern generation unit 24 calculates a phase modulation pattern (for example, a computer-generated hologram) for giving, to the output light, the spectrum phase represented by the phase spectrum function $\Phi_{TWC\text{-}TFD}(\omega)$ calculated in the phase spectrum design unit 22 and the spectrum intensity represented by the intensity spectrum function $A_{TWC\text{-}TFD}(\omega)$ calculated in the intensity spectrum design unit 23 (data generation step).

FIG. 23 is a diagram illustrating an example of a generation procedure of the target spectrogram $TargetSG_0(\omega, t)$ in the target generation unit 29. The target spectrogram $TargetSG_0(\omega, t)$ indicates a target temporal waveform. The temporal waveform is a temporal intensity waveform and a frequency component (wavelength band component) constituting the temporal intensity waveform. Therefore, the creation of the target spectrogram is a critical step for controlling the frequency component (wavelength band component). As illustrated in FIG. 23, the target generation unit 29 first receives inputs of the spectral waveform (initial intensity spectrum function $A_0(\omega)$ and initial phase spectrum function $\Phi_0(\omega)$ and the desired temporal intensity waveform function $Target_0(t)$. In addition, the target generation unit 29 receives an input of a time function $p_0(t)$ including desired frequency (wavelength) band information (process number (21)).

Then, the target generation unit 29 calculates a phase spectrum function $\Phi_{IFTA}(\omega)$ for realizing the temporal intensity waveform function $Target_0(t)$, for example, by using the iterative Fourier transform method illustrated in FIG. 20 (process number (22)).

Subsequently, the target generation unit 29 calculates an intensity spectrum function $A_{IFTA}(\omega)$ for realizing the temporal intensity waveform function $Target_0(t)$ by an iterative Fourier transform method using the previously obtained phase spectrum function $\Phi_{IFTA}(\omega)$ (process number (23)). FIG. 24 is a diagram illustrating an example of a procedure for calculating the intensity spectrum function $A_{IFTA}(\omega)$.

Referring to FIG. 24, first, an initial intensity spectrum function $A_{k=0}(\omega)$ and an initial phase spectrum function $\Psi_0(\omega)$ are prepared (process number (31) in FIG.). Then, a waveform function ($\omega$) in the frequency domain, which includes the intensity spectrum function $A_k(\omega)$ and the phase spectrum function $\Psi_0(\omega)$, is prepared (process number (32) in FIG.).

[Formula. 14]

$$\sqrt{A_k(\omega)}\,\exp\{i\Psi_0(\omega)\} \qquad \text{(o)}$$

The subscript k indicates after the k-th Fourier transform processing. Before the first Fourier transform processing, the intensity spectrum function $A_{k=0}(\omega)$ described above is used as the intensity spectrum function $A_k(\omega)$. i is an imaginary number.

Then, Fourier transform from the frequency domain to the time domain is performed on the function ($\omega$) (arrow A5 in FIG.). As a result, a waveform function (p) in the time domain, which includes the temporal intensity waveform function $b_k(t)$, is obtained (process number (33) in FIG.).

[Formula. 15]

$$\sqrt{b_k(t)}\exp\{i\Theta_k(t)\} \tag{p}$$

Subsequently, the temporal intensity waveform function $b_k(t)$ included in the function (p) is replaced with the temporal intensity waveform function $\text{Target}_0(t)$ based on a desired waveform (process numbers (34) and (35) in FIG.).

[Formula. 16]

$$b_k(t) := \text{Target}_0(t) \tag{q}$$

[Formula. 17]

$$\sqrt{\text{Target}_0(t)}\exp\{i\Theta_k(t)\} \tag{r}$$

Subsequently, inverse Fourier transform from the time domain to the frequency domain is performed on a function (r) (arrow A6 in FIG.). As a result, a waveform function (s) in the frequency domain, which includes an intensity spectrum function $C_k(\omega)$ and the phase spectrum function $\Psi_k(\omega)$, is obtained (process number (36) in FIG.).

[Formula. 18]

$$\sqrt{C_k(\omega)}\exp\{i\Psi_k(\omega)\} \tag{s}$$

Subsequently, in order to restrain the phase spectrum function $\Psi_k(\omega)$ included in the function (s), the phase spectrum function $\Psi_k(\omega)$ is replaced with the initial phase spectrum function $\Psi_0(\omega)$ (process number (37-a) in FIG.).

[Formula. 19]

$$\Psi_k(\omega) := \Psi_0(\omega) \tag{t}$$

In addition, filter processing based on the intensity spectrum of the input light is performed on the intensity spectrum function $C_k(\omega)$ in the frequency domain after the inverse Fourier transform. Specifically, in the intensity spectrum represented by the intensity spectrum function $C_k(\omega)$, a portion exceeding a cutoff intensity for each wavelength determined based on the intensity spectrum of the input light is cut. In an example, the cutoff intensity for each wavelength is set to coincide with the intensity spectrum (for example, the initial intensity spectrum function $A_{k=0}(\omega)$ of the input light. In this case, as represented in the following formula (u), at frequencies where the intensity spectrum function $C_k(\omega)$ is larger than the intensity spectrum function $A_{k=0}(\omega)$, the value of the intensity spectrum function $A_{k=0}$ ($\omega$) is taken as the value of the intensity spectrum function $A_k(\omega)$. At frequencies where the intensity spectrum function $C_k(\omega)$ is equal to or smaller than the intensity spectrum function $A_{k=0}(\omega)$, the value of the intensity spectrum function $C_k(\omega)$ is taken as the value of the intensity spectrum function $A_k(\omega)$ (process number (37-b) in FIG.).

[Formula. 20]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \tag{u}$$

The intensity spectrum function $C_k(\omega)$ included in the function (s) is replaced with the intensity spectrum function $A_k(\omega)$ after the filter processing in accordance with the above formula (u).

Thereafter, by repeatedly performing the above processes (32) to (37-b), the phase spectrum shape represented by the intensity spectrum function $A_k(\omega)$ in the waveform function can be brought close to the intensity spectrum shape corresponding to the desired temporal intensity waveform. Finally, the intensity spectrum function $A_{IFTA}(\omega)$ is obtained.

Refer to FIG. 23 again. By calculating the phase spectrum function $\Phi_{IFTA}(\omega)$ and the intensity spectrum function $A_{IFTA}(\omega)$ in the process numbers (22) and (23) described above, a third waveform function (v) in the frequency domain, which includes the above functions, is obtained (process number (24)).

[Formula. 21]

$$\sqrt{A_{IFTA}(\omega)}\exp\{i\Phi_{IFTA}(\omega)\} \tag{v}$$

The Fourier transform unit 29a of the target generation unit 29 performs the Fourier transform on the waveform function (v). As a result, a fourth waveform function (w) in the time domain is obtained (process number (25)).

[Formula. 22]

$$\sqrt{a_{IFTA}(t)}\exp\{i\varphi_{IFTA}(t)\} \tag{w}$$

The spectrogram modification unit 29b of the target generation unit 29 converts the fourth waveform function (w) into a spectrogram $SG_{IFTA}(\omega, t)$ by time-frequency transform (process number (26)). Then, in the process number (27), the target spectrogram $\text{TargetSG}_0(\omega, t)$ is generated by correcting the spectrogram $SG_{IFTA}(\omega, t)$ based on the time function $p_0(t)$ including the desired frequency (wavelength) band information (process number (28)). For example, a characteristic pattern appearing in the spectrogram $SG_{IFTA}(\omega, t)$ configured by two-dimensional data is partially cut out, and a frequency component of this portion is operated based on the time function $p_0(t)$. Specific examples thereof will be described below in detail.

For example, consider a case where a triple pulse having a time interval of 2 picoseconds is set as the desired temporal intensity waveform function $\text{Target}_0(t)$. At this time, the spectrogram $SG_{IFTA}(\omega, t)$ has a result as illustrated in FIG. 25(a). In FIG. 25(a), the horizontal axis indicates the time (unit: femtosecond), and the vertical axis indicates the wavelength (unit: nm). The value of the spectrogram is indicated by the brightness and darkness in FIG. 25(a), and the higher the brightness, the larger the value of the spectrogram. In this spectrogram $SG_{IFT4}(\omega, t)$, triple pulses appear as domains $D_1$, $D_2$, and $D_3$ separated on the time axis at intervals of 2 picoseconds. The center (peak) wavelengths of the domains $D_1$, $D_2$, and $D_3$ are 800 nm.

In a case where it is desired to control only the temporal intensity waveform of the output light (to simply obtain a triple pulse), it is not necessary to operate the domains $D_1$, $D_2$, and $D_3$. However, in a case where it is desired to control the frequency (wavelength) band of each pulse, it is necessary to operate the domains $D_1$, $D_2$, and $D_3$. That is, as illustrated in FIG. 25(b), moving the domains $D_1$, $D_2$, and $D_3$ independently of each other in a direction along the wavelength axis (vertical axis) means changing the constituent frequency (wavelength band) of each pulse. Such a change in the constituent frequency (wavelength band) of each pulse is performed based on the time function $p_0(t)$.

For example, when the time function $p_0(t)$ is described such that the peak wavelength of the domain $D_2$ is kept at 800 nm and the peak wavelengths of the domains $D_1$ and $D_3$ are translated by −2 nm and +2 nm, respectively, the spectrogram $SG_{IFT4}(\omega, t)$ changes to the target spectrogram $TargetSG_0(\omega, t)$ illustrated in FIG. 25(b). For example, by performing such processing on the spectrogram, it is possible to create the target spectrogram in which the constituent frequency (wavelength band) of each pulse is freely controlled without changing the shape of the temporal intensity waveform.

Effects obtained by the dispersion measuring device 1A and the dispersion measuring method in the present embodiment described above will be described.

When the wavelength dispersion amount of the optical component 7 is estimated, a plurality of optical pulses $Pb_1$ and $Pb_2$ having a time difference from each other and having center wavelengths different from each other are caused to be transmitted through the optical component 7. Then, the wavelength dispersion amount of the optical component 7 can be estimated based on the temporal waveform of the correlated light Pc obtained from the plurality of optical pulses $Pb_1$ and $Pb_2$. Here, when the peak intensities of the optical pulses $Pb_1$ and $Pb_2$ are large, the measurement accuracy of the wavelength dispersion amount may be lowered. For example, when the peak intensities of the optical pulses $Pb_1$ and $Pb_2$ exceed a certain threshold value in the optical component 7, a non-linear optical phenomenon occurs. FIG. 26 is a conceptual diagram illustrating temporal waveforms of the optical pulses $Pb_1$ and $Pb_2$ before and after the optical pulses $Pb_1$ and $Pb_2$ having a peak intensity equal to or greater than the threshold value Q1 of the non-linear optical phenomenon are transmitted through the optical component 7. As illustrated in FIG. 26, when the non-linear optical phenomenon occurs, the temporal waveforms of the optical pulses $Pb_1$ and $Pb_2$ are distorted. Alternatively, since the peak intensities of the optical pulses $Pb_1$ and $Pb_2$ are large, for example, the optical component 7 may be damaged. Also in this case, the temporal waveforms of the optical pulses $Pb_1$ and $Pb_2$ are distorted. When the temporal waveforms of the optical pulses $Pb_1$ and $Pb_2$ are distorted, the temporal waveform of the correlated light Pc is also distorted. Thus, when the peak intensities of the optical pulses $Pb_1$ and $Pb_2$ are large, it may not be possible to accurately measure the wavelength dispersion amount of the optical component 7 based on the temporal waveform of the correlated light Pc.

On the other hand, for example, it is conceivable to reduce the peak intensities of the optical pulses $Pb_1$ and $Pb_2$ when the pulse forming unit 3 generates the optical pulse train Pb. However, when the peak intensities of the optical pulses $Pb_1$ and $Pb_2$ are simply reduced in the pulse forming unit 3, the detection accuracy of the temporal waveform is lowered, and thus it may not be possible to accurately measure the wavelength dispersion amount of the optical component 7 based on the temporal waveform of the correlated light Pc. FIG. 27 is a conceptual diagram illustrating temporal waveforms of the optical pulses $Pb_1$ and $Pb_2$ before and after the optical pulses $Pb_1$ and $Pb_2$ with reduced peak intensity are transmitted through the optical component 7. As illustrated in FIG. 27, when the peak intensities of the optical pulses $Pb_1$ and $Pb_2$ are reduced in the pulse forming unit 3, the peak intensities of the optical pulses $Pb_1$ and $Pb_2$ after being transmitted through the optical component 7 may fall below the detection threshold value Q2 of the correlator 4. In this case, it is not possible to accurately measure the wavelength dispersion amount of the optical component 7.

In the dispersion measuring device 1A and the dispersion measuring method in the present embodiment, the positive or negative group delay dispersion is given to the optical pulse Pa in the pulse forming unit 3 (pulse forming step S102). As a result, since the peak intensities of the optical pulses $Pb_1$ and $Pb_2$ are suppressed, for example, it is possible to make the peak intensities of the optical pulses $Pb_1$ and $Pb_2$ propagating through the optical component 7 be equal to or smaller than the threshold value Q1 of the non-linear optical phenomenon. Alternatively, it is possible to prevent an occurrence of a situation in which the optical pulses $Pb_1$ and $Pb_2$ having a larger peak intensity enter into the optical component 7 as the optical component 7 is deteriorated, and the optical component 7 is damaged. Then, when the optical pulses $Pb_1$ and $Pb_2$ are transmitted through the optical component 7, and then is transmitted through the dispersion medium 8, a group delay dispersion having a sign opposite to the group delay dispersion given to the optical pulse Pa is given. As a result, it is possible to make the peak intensities of the optical pulses $Pb_1$ and $Pb_2$ be equal to or greater than the detection threshold value Q2 of the correlator 4. As a result, it is possible to accurately detect the temporal waveform of the correlated light Pc. From the above, according to the present embodiment, it is possible to accurately measure the wavelength dispersion amount of the optical component 7.

As in the present embodiment, the phase pattern presented to the SLM 14 may be a phase pattern for giving, to the optical pulse Pa, the group delay dispersion in which the peak intensities of the optical pulses $Pb_1$ and $Pb_2$ fall below the threshold value Q1 of the non-linear optical phenomenon in the optical component 7. In this case, since the occurrence of the non-linear optical phenomenon is suppressed, it is possible to suppress the distortion of the temporal waveforms of the optical pulses $Pb_1$ and $Pb_2$ and to suppress the distortion of the temporal waveform of the correlated light Pc.

As in the present embodiment, the correlator 4 including the correlation optical system 40 and the detector 400 may be adopted in order to detect the optical pulse train Pb transmitted through the optical component 7 as the measurement object. As illustrated in FIGS. 10 to 12, the correlation optical system 40 is an optical system that spatially and temporally superimposes the optical pulse train Pb with the optical pulse train Pb itself or another pulse train. Specifically, by temporally sweeping one pulse train, a correlation waveform conforming to the temporal waveform shape of the optical pulse train Pb is detected. Here, in general, since the pulse is swept by spatially changing the optical path length by a driving stage or the like, the movement amount of the stage corresponds to the time delay amount of the correlation waveform. At this time, the time delay amount with respect to the stage movement amount is very small. Therefore, by adopting the correlator 4, in the detector 400, it is possible to observe the pulse shape on a high time-resolved scale reaching the femtosecond order. As a result, it is possible to more accurately measure the wavelength dispersion amount of the optical component 7 as the measurement object.

(First Modification)

FIG. 28 is a diagram illustrating a dispersion measuring device 1B according to a first modification. As illustrated in FIG. 28, in the first modification, the dispersion medium 8 is disposed not on the optical path between the pulse forming unit 3 and the correlation optical system 40 but on an optical path between the correlation optical system 40 and the detector 400. The optical component 7 is disposed on the optical path between the pulse forming unit 3 and the correlation optical system 40. The correlation optical system 40 receives the optical pulse train Pb transmitted through the optical component 7 and outputs correlated light Pc including optical pulses $Pc_1$ to $Pc_3$ which are cross-correlation or autocorrelation of the optical pulse train Pb. The control device 5 is electrically connected to the pulse forming unit 3 and the detector 400.

The dispersion medium 8 having the positive or negative group delay dispersion receives the correlated light Pc output from the correlation optical system 40. At this time, the dispersion medium 8 gives the group delay dispersion to the optical pulses $Pc_1$ to $Pc_3$ included in the correlated light Pc to make the intensities of the optical pulses $Pc_1$ to $Pc_3$ equal to or greater than the threshold value (described later) of the detector 400.

The detector 400 receives the correlated light Pc transmitted through the dispersion medium 8 and detects the temporal waveform of the correlated light Pc having an intensity equal to or greater than the detection threshold value. The detection threshold value in the first modification is a value determined based on the characteristics of the detector 400. Since the correlated light Pc having an intensity equal to or greater than the detection threshold value enters to the detector 400, the detector 400 can accurately detect the temporal waveform of the correlated light Pc.

FIG. 29 is a flowchart illustrating a dispersion measuring method using the dispersion measuring device 1B having the above configuration. First, in an output step S201, the pulsed laser light source 2 outputs an optical pulse Pa.

Then, in a pulse forming step S202, the pulse forming unit 3 receives the optical pulse Pa and generates an optical pulse train Pb. Specifically, the pulse forming unit 3 forms the optical pulse train Pb from the optical pulse Pa output from the pulsed laser light source 2. The optical pulse train Pb is modulated light including a plurality of optical pulses $Pb_1$ and $Pb_2$ having a time difference from each other and having different center wavelengths from each other. At this time, the pulse forming unit 3 gives the positive or negative group delay dispersion to the optical pulse Pa. That is, the phase pattern presented to the SLM 14 gives the positive or negative group delay dispersion to the optical pulse Pa. As a result, in the formed optical pulses $Pb_1$ and $Pb_2$, it is possible to reduce the intensity in the time domain while maintaining the intensity in the spectrum domain.

Subsequently, in a correlated-light output step S203, the correlation optical system 40 outputs the correlated light Pc. Specifically, after the optical pulse train Pb is transmitted through the optical component 7, the correlation optical system 40 outputs the correlated light Pc including the optical pulses $Pc_1$ to $Pc_3$ that are cross-correlation or auto-correlation of the optical pulse train Pb. As an example, after the optical pulse train Pb is transmitted through the optical component 7, the correlation optical system 40 uses the optical element 42 including one or both of the non-linear optical crystal and the phosphor to generate the correlated light Pc including cross-correlation or autocorrelation of the optical pulse train Pb.

Subsequently, in a dispersion medium transmission step S204, the correlated light Pc is transmitted through the dispersion medium 8. Specifically, the dispersion medium 8 receives the correlated light Pc output from the correlation optical system 40. The correlated light Pc is transmitted through the dispersion medium 8 having a group delay dispersion having a sign opposite to the group delay dispersion given to the optical pulse Pa. As a result, when the correlated light Pc is transmitted through the dispersion medium 8, it is possible to increase the intensities of the optical pulses $Pc_1$ to $Pc_3$ in the time domain to be equal to or greater than the detection threshold value of the detector 400.

Subsequently, in a detection step S205, the detector 400 detects the temporal waveform of the correlated light Pc transmitted through the dispersion medium 8. Specifically, the detector 400 detects the temporal waveform of the correlated light Pc having an intensity equal to or greater than the detection threshold value of the detector 400.

Subsequently, in an arithmetic operation step S206, the arithmetic operation unit 5b estimates the wavelength dispersion amount of the optical component 7 based on the feature amount of the temporal waveform of the correlated light Pc.

In the dispersion measuring device 1B and the dispersion measuring method in the first modification, the positive or negative group delay dispersion is given to the optical pulse Pa in the pulse forming unit 3 (pulse forming step S202). As a result, since the intensities of the optical pulses $Pb_1$ and $Pb_2$ included in the optical pulse train Pb are suppressed, for example, it is possible to make the maximum intensities of the optical pulses $Pb_1$ and $Pb_2$ propagating through the optical component 7 be equal to or smaller than the threshold value Q1 of the non-linear optical phenomenon. Then, when the optical pulses $Pb_1$ and $Pb_2$ are transmitted through the optical component 7, and then the optical pulses $Pc_1$ to $Pc_3$ are transmitted through the dispersion medium 8, the group delay dispersion having a sign opposite to the group delay dispersion given to the optical pulse Pa is given. Therefore, it is possible to make the intensities of the optical pulses $Pc_1$ to $Pc_3$ be equal to or greater than the detection threshold value of the detector 400. This makes it possible to accurately detect the temporal waveform of the correlated light Pc. From the above, it is possible to accurately measure the wavelength dispersion amount of the optical component 7.

INDUSTRIAL APPLICABILITY

The embodiment can be used as a dispersion measuring device and a dispersion measuring method capable of more accurately measuring a wavelength dispersion amount of a measurement object.

REFERENCE SIGNS LIST 1A, 1B dispersion measuring device
2 pulsed laser light source
3 pulse forming unit

31

3a light input end
3b light output end
4 correlator
40, 40A, 40B, 40C correlation optical system
4a light input end
40b light output end
40c to 40f optical path
400 detector
5 control device
5a control unit
5b arithmetic operation unit
5c output unit
7 optical component (measurement object)
8 dispersion medium
8a light input end
8b light output end
12 diffraction grating
13, 15 lens
14 spatial light modulator (SLM)
16 diffraction grating
17 modulation surface
17a modulation region
20 modulation pattern calculation apparatus
21 arbitrary waveform input unit
22 phase spectrum design unit
23 intensity spectrum design unit
24 modulation pattern generation unit
25 fourier transform unit
26 function replacement unit
27 waveform function modification unit
28 inverse fourier transform unit
29 target generation unit
29a fourier transform unit
29b spectrogram modification unit
41,43 lens
42 optical element
44 beam splitter
45, 46, 48 mirror
47, 49 moving stage
51 processor
54 input device
55 output device
56 communication module
57 auxiliary storage device
Pa optical pulse (first optical pulse)
Pb, Pd optical pulse train
Pb$_1$, Pb$_2$ optical pulse (second optical pulse)
Pd$_1$, Pd$_2$ optical pulse
Pba, Pbb optical pulse train
Pc correlated light
Pc$_1$, Pc$_2$, Pc$_3$ optical pulse
Pr reference optical pulse
SC control signal
G11, G21 spectrum phase
G12, G22 spectrum intensity
The invention claimed is:

1. A dispersion measuring device comprising:
a light source configured to output a first optical pulse;
a pulse converter including a spatial light modulator configured to present a phase pattern for generating modulated light by applying a predetermined phase shift for each wavelength to the first optical pulse, a light input end of the pulse converter being optically coupled to the light source and the pulse converter forming an optical pulse train from the first optical pulse, and the optical pulse train being the modulated light including a plurality of second optical pulses having a time difference from each other and having center wavelengths different from each other;
a dispersion medium having a positive or negative group delay dispersion and configured to receive the optical pulse train formed by the pulse converter and to give a group delay dispersion to the plurality of second optical pulses included in the optical pulse train to increase peak intensities of the plurality of second optical pulses to be equal to or greater than the detection threshold value, a light input end of the dispersion medium being optically coupled to a light output end of the measurement object;
a correlator including a correlation optical system configured to receive the optical pulse train transmitted through the dispersion medium and output correlated light including a plurality of third optical pulses that are cross-correlation or autocorrelation of the optical pulse train, and a detector configured to detect a temporal waveform of the correlated light, the correlator detecting the temporal waveform of the correlated light formed from the optical pulse train having an intensity equal to or greater than a detection threshold value, a light input end of the correlator being optically coupled to a light output end of the dispersion medium; and
an arithmetic processor electrically connected to the correlator, wherein
a measurement object is disposed on an optical path between the pulse converter and the dispersion medium, a light input end of the measurement object being optically coupled to a light output end of the pulse converter,
the arithmetic processor estimates a wavelength dispersion amount of the measurement object based on the temporal waveform of the correlated light,
and
the phase pattern presented by the spatial light modulator of the pulse converter includes a pattern for giving a group delay dispersion having a sign opposite to the group delay dispersion of the dispersion medium to the first optical pulse so that peak intensities of the plurality of second optical pluses in the time domain are reduced.

2. The dispersion measuring device according to claim 1, wherein
the group delay dispersion given from the phase pattern is a negative group delay dispersion, and
the group delay dispersion given from the dispersion medium is a positive group delay dispersion.

3. The dispersion measuring device according to claim 1, wherein the phase pattern is a phase pattern for giving, to the first optical pulse, a group delay dispersion in which peak intensities of the plurality of second optical pulses fall below a threshold value of a non-linear optical phenomenon in the measurement object.

4. The dispersion measuring device according to claim 1, wherein the dispersion medium is made of a material in which a non-linear optical phenomenon does not occur.

5. The dispersion measuring device according to claim 1, wherein the dispersion medium is an optical fiber, an optical waveguide, a semiconductor, a dielectric optical crystal, a grating pair, a prism pair, or a glass body.

6. The dispersion measuring device according to claim 5, wherein the dispersion medium is a single mode fiber, a multi-mode fiber, a rare-earth-doped fiber, a photonic crystal fiber, a dispersion shifted fiber, or a double clad fiber.

7. The dispersion measuring device according to claim 5, wherein the dispersion medium is a semiconductor waveguide containing SiN or InP.

8. The dispersion measuring device according to claim 5, wherein the dispersion medium is diamond, $SiO_2$, $LiNbO_3$, $LiTaO_3$, lanthanum-doped lead zirconate titanate, Si, Ge, fullerene, graphite, graphene, carbon nanotube, GaN, GaAs, a magnetic body, an organic material, or a polymer material.

9. A dispersion measuring device comprising:

a light source configured to output a first optical pulse;

a pulse converter including a spatial light modulator configured to present a phase pattern for generating modulated light by applying a predetermined phase shift for each wavelength to the first optical pulse, a light input end of the pulse converter is optically coupled to the light source and the pulse converter forming an optical pulse train from the first optical pulse, and the optical pulse train being the modulated light including a plurality of second optical pulses having a time difference from each other and having center wavelengths different from each other;

a correlation optical system configured to receive the optical pulse train and output correlated light including a plurality of third optical pulses that are cross-correlation or autocorrelation of the optical pulse train;

a dispersion medium having a positive or negative group delay dispersion and configured to receive the correlated light output from the correlation optical system, a light input end of the dispersion medium being optically coupled to a light output end of the correlation optical system and to give a group delay dispersion to the plurality of third optical pulses included in the correlated light to increase peak intensities of the plurality of third optical pulses to be equal to or greater than the detection threshold value;

a detector configured to receive the correlated light transmitted through the dispersion medium and detect a temporal waveform of the correlated light having a peak intensity equal to or greater than a detection threshold value; and an arithmetic processor electrically connected to the detector, wherein a measurement object is disposed on an optical path between the pulse converter and the correlation optical system, a light input end of the measurement object being optically coupled to a light output end of the pulse converter and a light output end of the measurement object being optically coupled to a light input end of the correlation optical system, the arithmetic processor estimates a wavelength dispersion amount of the measurement object based on the temporal waveform of the correlated light, and the phase pattern presented by the spatial light modulator of the pulse converter includes a pattern for giving a group delay dispersion having a sign opposite to the group delay dispersion of the dispersion medium to the first optical pulse so that peak intensities of the plurality of third optical pluses in the time domain are reduced.

10. A dispersion measuring method comprising:

outputting a first optical pulse;

forming an optical pulse train from the first optical pulse, after outputting the first light pulse, the optical pulse train being modulated light including a plurality of second optical pulses having a time difference from each other and having center wavelengths different from each other, by using a spatial light modulator configured to present a phase pattern for generating the modulated light by applying a predetermined phase shift for each wavelength to the first optical pulse;

transmitting the optical pulse train through a dispersion medium having a positive or negative group delay dispersion after forming the optical pulse train from the first light pulse and configured to give a group delay dispersion to the plurality of second optical pulses included in the optical pulse train to increase peak intensities of the plurality of second optical pulses to be equal to or greater than the detection threshold value, and transmitting the optical pulse train through a measurement object;

receiving the optical pulse train transmitted through the dispersion medium, generating correlated light including a plurality of third optical pulses that are cross-correlation or autocorrelation of the optical pulse train, and detecting a temporal waveform of the correlated light formed from the optical pulse train having a peak intensity equal to or greater than a detection threshold value; and estimating a wavelength dispersion amount of the measurement object based on the temporal waveform of the correlated light, wherein the phase pattern presented by the spatial light modulator in forming the optical pulse train includes a pattern for giving a group delay dispersion having a sign opposite to the group delay dispersion of the dispersion medium to the first optical pulse.

11. A dispersion measuring method comprising:

outputting a first optical pulse;

forming an optical pulse train from the first optical pulse, after outputting the first light pulse, the optical pulse train being modulated light including a plurality of second optical pulses having a time difference from each other and having center wavelengths different from each other, by using a spatial light modulator configured to present a phase pattern for generating the modulated light by applying a predetermined phase shift for each wavelength to the first optical pulse;

outputting correlated light including a plurality of third optical pulses that are cross-correlation or autocorrelation of the optical pulse train after the optical pulse train is formed from the first light pulse and is transmitted through a measurement object;

transmitting the correlated light through a dispersion medium having a positive or negative group delay dispersion and configured to give a group delay dispersion to the plurality of third optical pulses included in the correlated light so that intensities of the plurality of third optical pulses are increased to be equal to or greater than the detection threshold value;

detecting a temporal waveform of the correlated light transmitted through the dispersion medium; and estimating a wavelength dispersion amount of the measurement object based on the temporal waveform of the correlated light, wherein in the detecting, the temporal waveform of the correlated light having an intensity equal to or greater than a detection threshold value is detected, the phase pattern presented by the spatial light modulator in forming the optical pulse train includes a pattern for giving a group delay dispersion having a sign opposite to the group delay dispersion of the dispersion medium to the first optical pulse.

12. The dispersion measuring device according to claim 9, wherein the group delay dispersion given from the phase pattern is a negative group delay dispersion, and the group delay dispersion given from the dispersion medium is a positive group delay dispersion.

13. The dispersion measuring device according to claim 9, wherein the phase pattern is a phase pattern for giving, to the first optical pulse, a group delay dispersion in which peak intensities of the plurality of second optical pulses fall below a threshold value of a non-linear optical phenomenon in the measurement object.

14. The dispersion measuring device according to claim 9, wherein the dispersion medium is made of a material in which a non-linear optical phenomenon does not occur.

15. The dispersion measuring device according to claim 9, wherein the dispersion medium is an optical fiber, an optical waveguide, a semiconductor, a dielectric optical crystal, a grating pair, a prism pair, or a glass body.

16. The dispersion measuring device according to claim 15, wherein the dispersion medium is a single mode fiber, a multi-mode fiber, a rare-earth-doped fiber, a photonic crystal fiber, a dispersion shifted fiber, or a double clad fiber.

17. The dispersion measuring device according to claim 15, wherein the dispersion medium is a semiconductor waveguide containing SiN or InP.

18. The dispersion measuring device according to claim 15, wherein the dispersion medium is diamond, $SiO_2$, $LiNbO_3$, $LiTaO_3$, lanthanum-doped lead zirconate titanate, Si, Ge, fullerene, graphite, graphene, carbon nanotube, GaN, GaAs, a magnetic body, an organic material, or a polymer material.

\* \* \* \* \*